United States Patent
Bilgin et al.

(10) Patent No.: US 10,530,229 B2
(45) Date of Patent: Jan. 7, 2020

(54) SWITCHED RELUCTANCE MACHINE WITH ODD POLE-PHASE INDEX

(71) Applicant: Enedym Inc., Hamilton (CA)

(72) Inventors: Berker Bilgin, Hamilton (CA); Ali Emadi, Burlington (CA)

(73) Assignee: Enedym Inc., Hamilton, Ontario (CA)

( * ) Notice: Subject to any disclaimer, the term of this patent is extended or adjusted under 35 U.S.C. 154(b) by 0 days.

(21) Appl. No.: 15/574,209

(22) PCT Filed: May 13, 2016

(86) PCT No.: PCT/CA2016/050551
§ 371 (c)(1),
(2) Date: Nov. 15, 2017

(87) PCT Pub. No.: WO2016/183673
PCT Pub. Date: Nov. 24, 2016

(65) Prior Publication Data
US 2018/0131261 A1 May 10, 2018

Related U.S. Application Data

(60) Provisional application No. 62/161,907, filed on May 15, 2015.

(51) Int. Cl.
*H02K 19/10* (2006.01)
*H02P 25/092* (2016.01)
(Continued)

(52) U.S. Cl.
CPC .......... *H02K 19/103* (2013.01); *H02K 1/14* (2013.01); *H02K 15/022* (2013.01); *H02K 19/24* (2013.01);
(Continued)

(58) Field of Classification Search
CPC ....... H02P 25/092; H02P 25/098; H02K 1/14; H02K 15/022; H02K 19/24
(Continued)

(56) References Cited

U.S. PATENT DOCUMENTS 6,150,791 A 11/2000 Fulton
6,781,273 B2 8/2004 Jinupun
(Continued)

FOREIGN PATENT DOCUMENTS

JP WO 2012073290 * 6/2012

OTHER PUBLICATIONS

Comparative Study of a Fault-Tolerant Multiphase Wound-Field Doubly Salient Machine for Electrical Actuators (Year: 2015).*
(Continued)

*Primary Examiner* — Bickey Dhakal
*Assistant Examiner* — Zemenay T Truneh
(74) *Attorney, Agent, or Firm* — Bereskin & Parr LLP/S.E.N.C.R.L., s.r.l.; Stephen M. Beney

(57) ABSTRACT

Various embodiments are described herein for switched reluctance machine configurations. In at least one embodiment, a switched reluctance machine configured according to the teachings herein comprises a stator including a predetermined number of salient stator poles ($N_s$), a rotor rotatably mounted with respect to the stator, with the rotor comprising a plurality of salient rotor poles, and a plurality of coils provided around the predetermined number of stator poles to form at least one phase of the switched reluctance machine, where the rotor poles and the stator poles are symmetrically disposed, and a number of rotor poles is related to $N_s$ and a number of phases according to: i) (Ns/m)k ceil (mod (k,m)/m) for an odd number of phases, and ii) (Ns/m)k ceil (mod(k,m/2)/m/2) for an even number (Continued)

of phases, where m is the number of phases, and k is a configuration index based on $N_s$ and m.

20 Claims, 11 Drawing Sheets

(51) Int. Cl.
  *H02P 25/098* (2016.01)
  *H02K 1/14* (2006.01)
  *H02K 15/02* (2006.01)
  *H02K 19/24* (2006.01)

(52) U.S. Cl.
  CPC .......... *H02P 25/092* (2016.02); *H02P 25/098* (2016.02); *H02K 2213/03* (2013.01)

(58) Field of Classification Search
  USPC ........................ 318/254.1, 808; 310/216.075
  See application file for complete search history.

(56) References Cited

U.S. PATENT DOCUMENTS

| | | | |
|---|---|---|---|
| 7,230,360 | B2 | 6/2007 | Desai et al. |
| 8,120,215 | B2* | 2/2012 | Nashiki .................. H02K 21/24 310/106 |
| 2001/0036415 | A1 | 11/2001 | Pijanowski |
| 2009/0021192 | A1* | 1/2009 | Kudligi .................. H02K 1/246 318/254.1 |
| 2009/0200980 | A1* | 8/2009 | Ramu .................... H02P 25/092 318/701 |
| 2010/0253178 | A1* | 10/2010 | Koyama .................. H02K 1/14 310/216.113 |
| 2013/0169075 | A1* | 7/2013 | Lee ...................... H02K 19/103 310/49.44 |

OTHER PUBLICATIONS

P.C. Desai et al. (Abstract) "Novel Switched Reluctance Machine Configuration With Higher Number of Rotor Poles Than Stator Poles: Concept to Implementation", IEEE Transactions on Industrial Electronics. Feb. 1, 2010. vol. 57, No. 2. pp. 649-659.

Li-Wei Shi et al. "Comparative Study of a Fault-Tolerant Multiphase Wound-Field Doubly Salient Machine for Electrical Actuators", Energies. Apr. 29, 2015. vol. 8, No. 5. pp. 3640-3660.

Tje Miller. "Optimal Design of Switched Reluctance Motors, IEEE Transactions on Industrial Electronics", Feb. 1, 2002. vol. 49, No. 1. pp. 15-27.

European Search Report for corresponding European Patent Application No. 16795587.1 dated Nov. 22, 2018.

* cited by examiner

SWITCHED RELUCTANCE MACHINE WITH ODD POLE-PHASE INDEX

CROSS-REFERENCE TO RELATED APPLICATION

This application claims the benefit of U.S. Provisional Patent Application No. 62/161,907 filed May 15, 2015, the contents of which are incorporated herein by reference.

TECHNICAL FIELD

The described embodiments relate generally to a switched reluctance machine, and in particular, to a switched reluctance machine and method of manufacturing a switched reluctance machine having an odd number of stator poles per phase.

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

Conventional switched reluctance machines typically have concentrated windings around each stator pole to generate electromagnetic field. Typically, in a switched reluctance machine, depending on the number of poles in each phase, the windings around the stator poles are connected in series and/or parallel to create phase windings. When a phase is energized, the flux generated by the coil windings closes its path through the rotor and the closest rotor pole rotates to get in alignment with the stator pole. Due to double saliency, i.e. salient poles around both the stator and the rotor, when the rotor pole moves towards the stator pole, the airgap length, and, hence, the stored energy changes.

However, conventional switched reluctance machines often suffer from high torque ripple, low torque density, vibration and acoustic noise.

SUMMARY

In one aspect, at least one embodiment described herein provides a switched reluctance machine comprising a stator including a predetermined number of stator poles, wherein each stator pole is a salient pole; a rotor rotatably mounted with respect to the stator, the rotor comprising a plurality of rotor poles, wherein the plurality of rotor poles are salient poles, and a plurality of coils provided around the predetermined number of stator poles to form at least one phase of the switched reluctance machine, the plurality of coils adapted to carry electric current to generate magnetic flux in the predetermined number of stator poles, wherein the plurality of rotor poles and the predetermined number of stator poles are symmetrically disposed, and wherein a number of rotor poles is related to the predetermined number of stator poles and a number of phases according to:

$$\left(\frac{N_s}{m}\right)k\operatorname{ceil}\left(\frac{\operatorname{mod}(k,m)}{m}\right),$$

if the number of phases is an odd number, and $$\left(\frac{N_s}{m}\right)k\operatorname{ceil}\left(\frac{\operatorname{mod}\left(k,\frac{m}{2}\right)}{\frac{m}{2}}\right),$$

if the number of phases is an even number, wherein $N_s$ is the predetermined number of stator poles, m is the number of phases, and k is a configuration index based on the predetermined number of stator poles and the number of phases.

In another aspect, in at least one embodiment described herein, there is provided a switched reluctance machine having salient rotor poles and salient stator poles in a numerical relationship defined by the formula:

$$N_r = \left(\frac{N_s}{m}\right)k\operatorname{ceil}\left(\frac{\operatorname{mod}(k,m)}{m}\right),$$

for an odd number of phases, and $$N_r = \left(\frac{N_s}{m}\right)k\operatorname{ceil}\left(\frac{\operatorname{mod}\left(k,\frac{m}{2}\right)}{\frac{m}{2}}\right),$$

for an even number of phases, wherein $N_s$ is a number of salient stator poles, $N_r$ is a number of salient rotor poles, m is a number of phases, and k is a configuration index based on the number of salient stator poles and the number of phases, and wherein the salient stator poles and the salient rotor poles are symmetrically disposed.

In another aspect, in at least one embodiment described herein, there is provided a method for manufacturing a switched reluctance machine having a number of rotor poles and a number of stator poles, the method including determining one of the number of rotor poles and the number of stator poles; determining a number of phases; determining the other of the number of rotor poles and the number of stator poles according to $$\left(\frac{N_s}{m}\right)k\operatorname{ceil}\left(\frac{\operatorname{mod}(k,m)}{m}\right),$$

if the number of phases is an odd number, and $$\left(\frac{N_s}{m}\right)k\operatorname{ceil}\left(\frac{\operatorname{mod}\left(k,\frac{m}{2}\right)}{\frac{m}{2}}\right),$$

if the number of phases is an even number, wherein $N_s$ is the predetermined number of stator poles, m is the number of phases, and k is a configuration index based on the predetermined number of stator poles and the number of phases; providing a stator having the number of stator poles, wherein each stator pole is a salient pole and the stator poles are symmetrical disposed; rotatably mounting a rotor with respect to the stator, the rotor having the number of rotor poles, wherein the rotor poles are salient poles at the rotor poles are symmetrically disposed; and winding a plurality of coils around the number of stator poles to form the number of phases of the switched reluctance machine, the plurality of coils adapted to carry electric current to generate magnetic flux in the number of stator poles.

In various embodiments of a switched reluctance machine and/or a method for manufacturing a switched reluctance machine, a pole-phase index is an odd number, where the pole-phase index is a ratio of the predetermined number of stator poles to the number of phases.

In various embodiments of a switched reluctance machine and/or a method for manufacturing a switched reluctance machine, the predetermined number of stator poles is an even number if the number of phase is an even number, and the predetermined number of stator poles is an odd number if the number of phases is an odd number.

In various embodiments of a switched reluctance machine and/or a method for manufacturing a switched reluctance machine, the configuration index is determined according to:

$$k = \left\{ \frac{m+2}{2}, \frac{m+2}{2}+1, \frac{m+2}{2}+2, \ldots \right\},$$

if the number of phases is an even number, and $$k = \left\{ \frac{m+1}{2}, \frac{m+1}{2}+1, \frac{m+1}{2}+2, \ldots \right\},$$

if the number of phases is an odd number.

In various embodiments of a switched reluctance machine and/or a method for manufacturing a switched reluctance machine, the plurality of coils are provided around the predetermined number of stator poles in a mutually coupled configuration.

In various embodiments of a switched reluctance machine and/or a method for manufacturing a switched reluctance machine, the predetermined number of stator poles and the plurality of rotor poles are disposed in a configuration selected from the group consisting of an interior rotor configuration, an exterior rotor configuration, an axial flux configuration, a linear configuration, a multiple-rotor configuration and a multiple-stator configuration.

In various embodiments of a switched reluctance machine and/or a method for manufacturing a switched reluctance machine, the predetermined number of stator poles is equidistant from each other to provide a symmetrical disposition.

In various embodiments of a switched reluctance machine and/or a method for manufacturing a switched reluctance machine, the plurality of rotor poles are equidistant from each other to provide a symmetrical disposition.

In various embodiments of a switched reluctance machine and/or a method for manufacturing a switched reluctance machine, the predetermined number of stator poles and the plurality of rotor poles are manufactured using a soft magnetic material.

In various embodiments of a switched reluctance machine and/or a method for manufacturing a switched reluctance machine, each stator pole of the predetermined number of stator poles has an electrical position determined according to:

$$N_{s\_elect} = \mathrm{mod}((N_{s\_mech} - N_{r\_mech})N_r + 180°, 360)$$

where $N_{s\_elect}$ is the electrical position of a stator pole, $N_{s\_mech}$ is a mechanical position of the stator pole, and $N_{r\_mech}$ is a mechanical position of a rotor pole, where the mechanical position of each stator pole is determined according to $\theta_s[p] = T_{ps}(p-1)$, where $$T_{ps} = \frac{360}{N_s},$$

and $p = 1, 2, \ldots, N_s$, wherein $\theta_s[p]$ is the mechanical position of each stator pole, and where the mechanical position of each rotor pole is determined according to $\theta_r[p] = T_{pr}(t-1)$, where $$T_{pr} = \frac{360}{N_r},$$

$t = 1, 2, \ldots, N_r$, wherein $\theta_r[t]$ is the mechanical position of each rotor pole.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figures 1A, 1B:
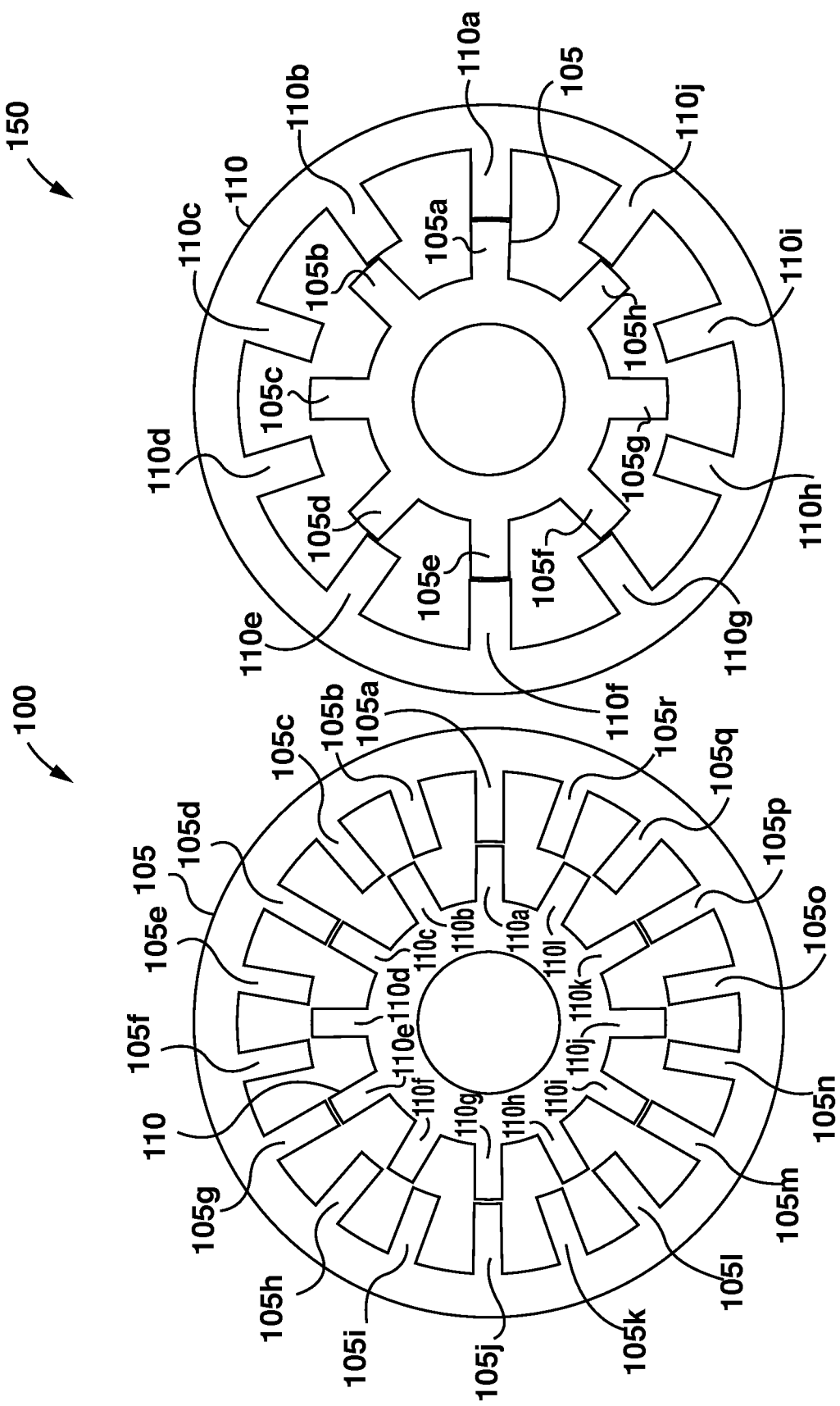
FIG. 1A illustrates a conventional 18/12 switched reluctance machine according to an example embodiment.
FIG. 1B illustrates a conventional 8/10 switched reluctance machine according to an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical, electrical or magnetic connotation. For example, as used herein, the terms "coupled" or "coupling" can indicate that two elements or devices can be directly connected to one another or connected to one another through one or more intermediate elements or devices via an electrical element, electrical signal, a mechanical element or magnetic flux such as but not limited to, a wire, a cable, or magnetic field, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

Reference is first made to FIGS. 1A, 1B, 2, 3 and 4 illustrating cross-sectional views of conventional switched reluctance machines ("SRMs"). FIG. 1A illustrates a cross-sectional view of a conventional 18/12 SRM 100 according to an example embodiment. The 18/12 SRM 100 has a stator 105 and a rotor 110 located inside the stator 105. Stator 105 comprises eighteen stator poles and rotor 110 comprises twelve rotor poles. As illustrated, conventional 18/12 SRM 100 includes a first stator pole 105a, a second stator pole 105b, a third stator pole 105c, a fourth stator pole 105d, a fifth stator pole 105e, a sixth stator pole 105f, a seventh stator pole 105g, an eighth stator pole 105h, a ninth stator pole 105i, a tenth stator pole 105j, an eleventh stator pole 105k, a twelfth stator pole 105l, a thirteenth stator pole 105m, a fourteenth stator pole 105n, a fifteenth stator pole 105o, a sixteenth stator pole 105p, a seventeenth stator pole 105q and an eighteenth stator pole 105r. The conventional 18/12 SRM 100 further includes a first rotor pole 110a, a second rotor pole 110b, a third rotor pole 110c, a fourth rotor pole 110d, a fifth rotor pole 110e, a sixth rotor pole 110f, a seventh rotor pole 110g, an eighth rotor pole 110h, a ninth rotor pole 110i, a tenth rotor pole 110j, an eleventh rotor pole 110k and a twelfth rotor pole 110l.

Reference is next made to FIG. 1B, which illustrates a cross-sectional view of a conventional 8/10 SRM 150 according to an example embodiment. The 8/10 SRM 150 has a rotor 110 and a stator 105 located inside the rotor 110. Stator 105 comprises eight stator poles and rotor 110 comprises ten rotor poles. As illustrated, the 8/10 SRM 150 includes a first stator pole 105a, a second stator pole 105b, a third stator pole 105c, a fourth stator pole 105d, a fifth stator pole 105e, a sixth stator pole 105f, a seventh stator pole 105g and an eighth stator pole 105h. The conventional 8/10 SRM 150 also includes a first rotor pole 110a, a second rotor pole 110b, a third rotor pole 110c, a fourth rotor pole 110d, a fifth rotor pole 110e, a sixth rotor pole 110f, a seventh rotor pole 110g, an eighth rotor pole 110h, a ninth rotor pole 110i and a tenth rotor pole 110j.

Figure 2:
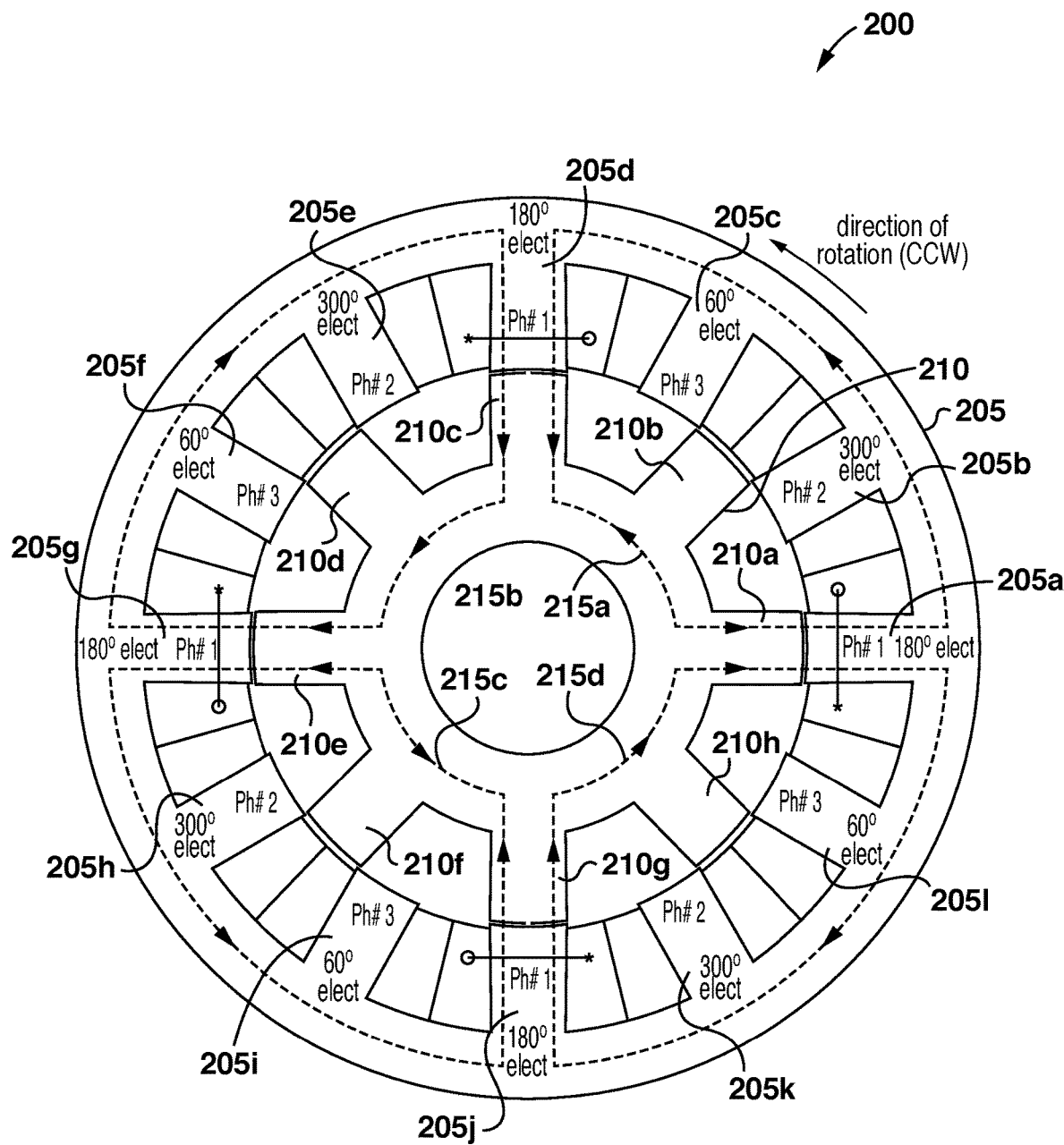
FIG. 2 illustrates a three-phase 12/8 switched reluctance machine according to an example embodiment.

Reference is next made to FIG. 2, which illustrates a cross-sectional view of a conventional 3-phase 12/8 SRM 200 according to an example embodiment. The SRM 200 has a stator 205 and a rotor 210 located inside the stator 205. Stator 205 comprises twelve stator poles and rotor 210 comprises eight rotor poles. As illustrated, the 12/8 SRM 200 includes a first stator pole 205a, a second stator pole 205b, a third stator pole 205c, a fourth stator pole 205d, a fifth stator pole 205e, a sixth stator pole 205f, a seventh stator pole 205g, an eighth stator pole 205h, a ninth stator pole 205i, a tenth stator pole 205j, an eleventh stator pole 205k and a twelfth stator pole 205l. The 12/8 SRM 200 also includes a first rotor pole 210a, a second rotor pole 210b, a third rotor pole 210c, a fourth rotor pole 210d, a fifth rotor pole 210e, a sixth rotor pole 210f, a seventh rotor pole 210g and an eighth rotor pole 210h.

Figure 3:
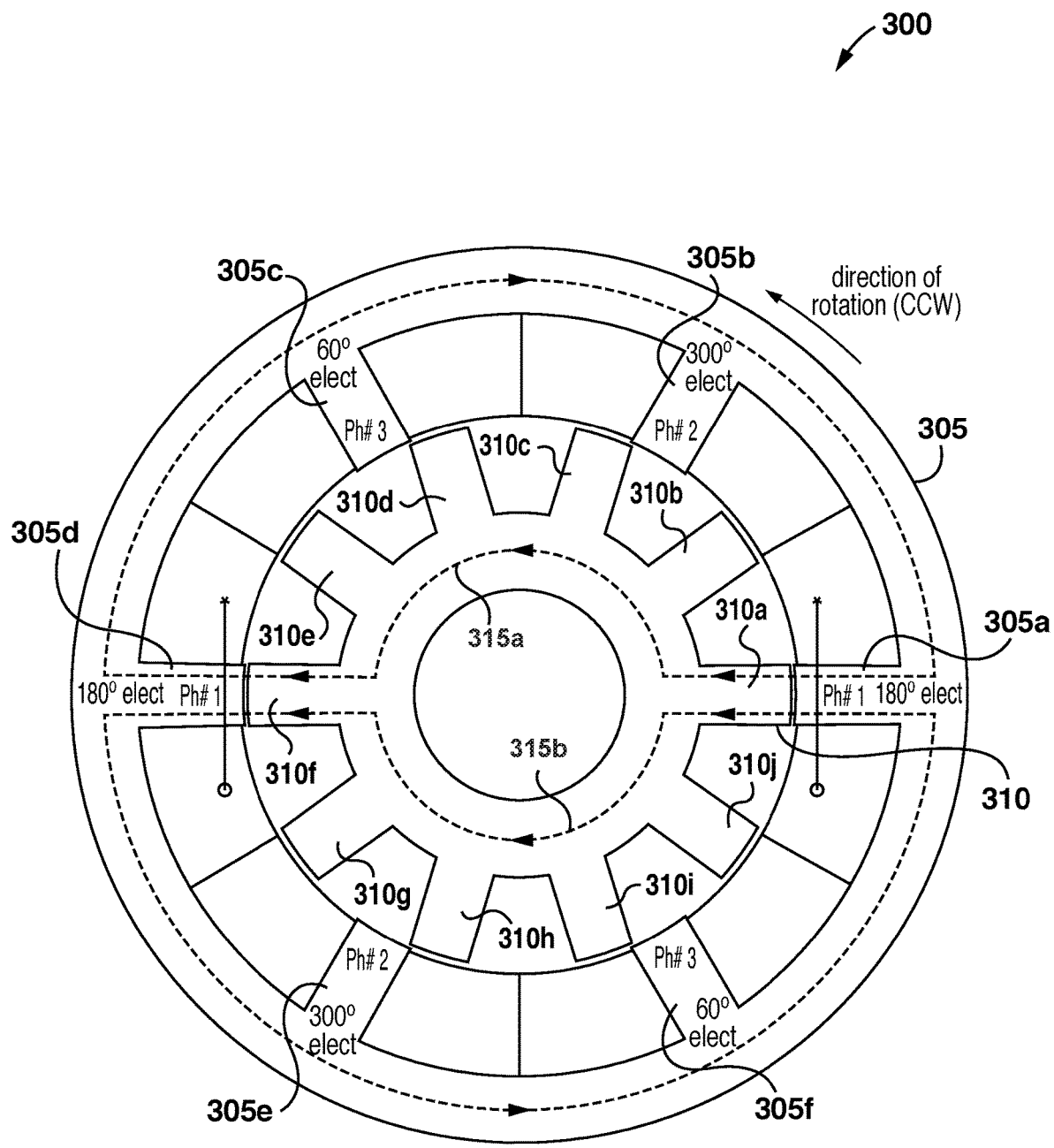
FIG. 3 illustrates a three-phase 6/10 switched reluctance machine according to an example embodiment.

Next, reference is made to FIG. 3, which illustrates a cross-sectional view of a 3-phase 6/10 SRM 300 according to an example embodiment. The SRM 300 has a stator 305 and a rotor 310 located inside the stator 305. Stator 305 comprises six stator poles and rotor 310 comprises ten rotor poles. As illustrated, the 6/10 SRM 300 includes a first stator pole 305a, a second stator pole 305b, a third stator pole 305c, a fourth stator pole 305d, a fifth stator pole 305e, and a sixth stator pole 305f. The 6/10 SRM 300 also includes a first rotor pole 310a, a second rotor pole 310b, a third rotor pole 310c, a fourth rotor pole 310d, a fifth rotor pole 310e, a sixth rotor pole 310f, a seventh rotor pole 310g, an eighth rotor pole 310h, a ninth rotor pole 310i, and a tenth rotor pole 310j.

Figure 4:
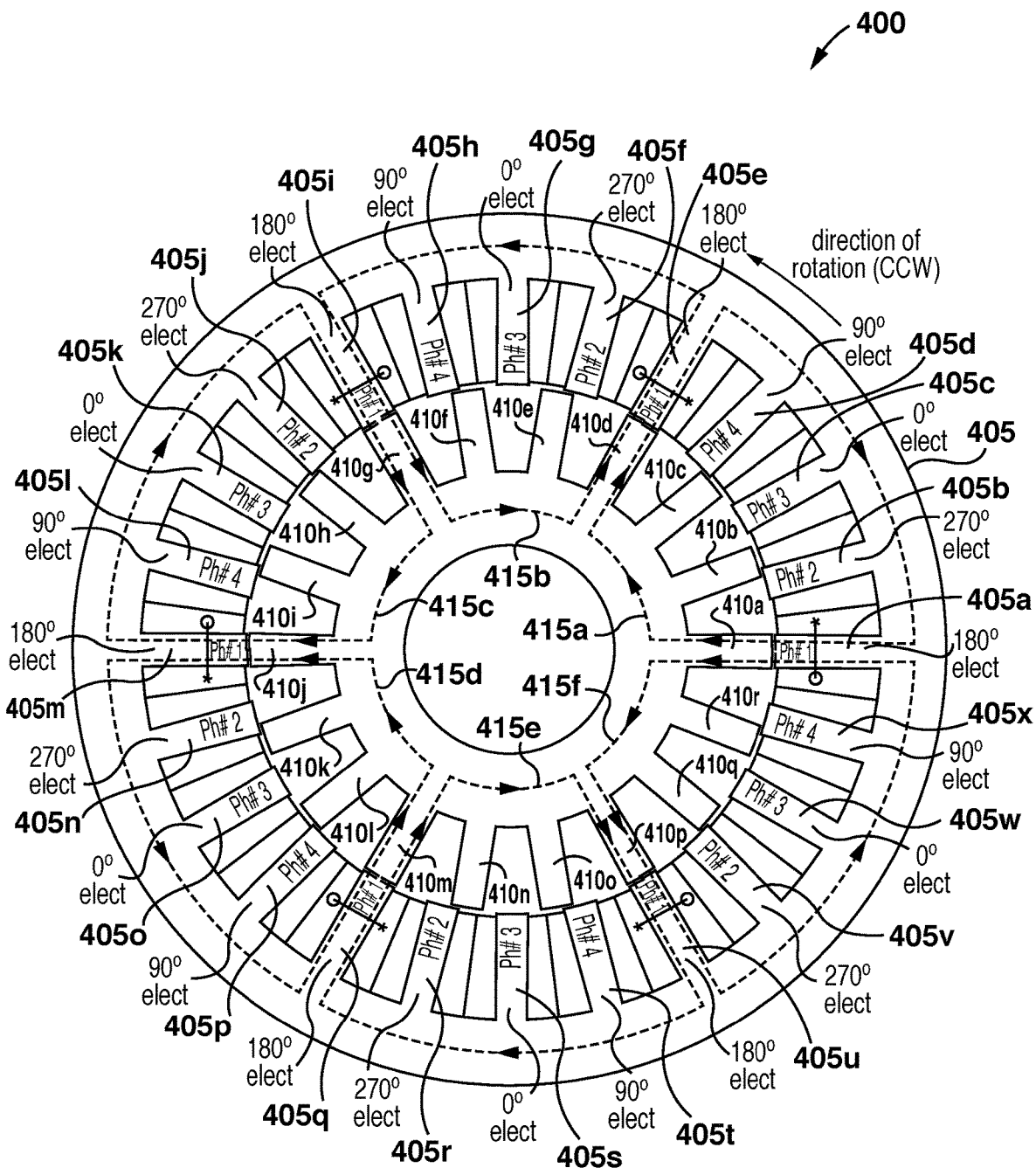
FIG. 4 illustrates a four-phase 24/18 switched reluctance machine according to an example embodiment.

FIG. 4 illustrates a cross-sectional view of a 4-phase 24/18 SRM 400 according to an example embodiment. The SRM 400 has a stator 405 and a rotor 410 located inside the stator 405. Stator 405 comprises twenty-four stator poles and rotor 410 comprises eighteen rotor poles. As illustrated, the 24/18 SRM 400 includes a first stator pole 405a, a second stator pole 405b, a third stator pole 405c, a fourth stator pole 405d, a fifth stator pole 405e, a sixth stator pole 405f, a seventh stator pole 405g, an eighth stator pole 405h, a ninth stator pole 405i, a tenth stator pole 405j, an eleventh stator pole 405k, a twelfth stator pole 405l, a thirteenth stator pole 405m, a fourteenth stator pole 405n, a fifteenth stator pole 405o, a sixteenth stator pole 405p, a seventeenth stator pole 405q, an eighteenth stator pole 405r, a nineteenth stator pole 405s, a twentieth stator pole 405t, a twenty-first stator pole 405u, a twenty-second stator pole 405v, a twenty-third stator pole 405w and a twenty-fourth stator pole 405x.

The 24/18 SRM 400 also includes a first rotor pole 410a, a second rotor pole 410b, a third rotor pole 410c, a fourth rotor pole 410d, a fifth rotor pole 410e, a sixth rotor pole 410f, a seventh rotor pole 410g, an eighth rotor pole 410h, a ninth rotor pole 410i, a tenth rotor pole 410j, an eleventh rotor pole 410k, a twelfth rotor pole 410l, a thirteenth rotor pole 410m, a fourteenth rotor pole 410n, a fifteenth rotor pole 410o, a sixteenth rotor pole 410p, a seventeenth rotor pole 410q, and an eighteenth rotor pole 410r.

Conventional SRMs, such as those illustrated in FIGS. 1A, 1B, 2, 3 and 4 often suffer from various disadvantages, including high torque ripple, low torque density, vibration and acoustic noise, etc. Furthermore, attempts to overcome these disadvantages by reconfiguring the SRMs, such as by increasing the number of stator and rotor poles, increasing the number of phases etc., often requires constant iterations and experimentations to determine a workable configuration of the SRM.

The various embodiments disclosed herein relate to a family of SRMs having an odd pole-phase index, or in other words, switched reluctance machines having an odd number of stator poles per phase. In addition, the various embodiments disclosed herein relate to a family of SRMs comprising mutually coupled coil configurations in order to maintain a balanced flux pattern. In the various embodiments disclosed herein, for a given number of phases, pole-phase index and configuration index, SRMs are configured to have a different combination of number of stator poles and number of rotor poles as compared to conventional topologies.

In the various embodiments illustrated herein, the rotors and stators of the SRMs are manufactured using soft magnetic materials, examples of which may include laminated electrical steel, soft magnetic composites etc. The teachings of the various embodiments illustrated herein can be applied to any type of SRM configuration. For example, the various embodiments illustrated herein can be applied to a SRM with an interior rotor configuration where the rotor is disposed inside the stator or an exterior rotor configuration where the stator is disposed inside the rotor.

The various embodiments illustrated herein can also be applied to a SRM with an axial flux configuration. An axial flux SRM typically utilizes one or more rotor discs spaced along a rotor shaft, where each rotor disc has a plurality of rotor poles spaced along the periphery of the rotor disc. In the axial flux SRM, stator elements are distributed circumferentially about the rotor discs and form pairs of radially extending stator poles for axially straddling the rotor discs.

The various embodiments illustrated herein can also be applied to a SRM with a linear configuration. A linear SRM is typically a linear version of a rotary SRM and comprises the stator and the rotor unrolled into a plane. Similarly, the various embodiments illustrated herein can also be applied to a SRM with a multiple-rotor configuration where a stator and multiple rotors are disposed concentrically, or a multiple-stator configuration where a rotor and multiple stators are disposed concentrically. The various embodiments illustrated herein can also be applied to other types of SRM configurations.

In various embodiments illustrated herein, the stators of the SRMs have coils wound around each stator pole. In some such embodiments, the rotors do not have any kind of excitation source, such as coils, permanent magnets etc. In some other such embodiments, the rotors also comprise some kind of excitation source, such as, permanent magnets for example.

Depending on criteria such as configuration and performance requirements of the SRMs, the coils may be connected to the stator in series, parallel or in a combination of series/parallel circuits to create an electrical phase. When current is applied to a phase, the magnetic flux magnetizes the rotor pole and attracts it towards the stator pole, thereby decreasing the airgap between the rotor and the stator poles. This reduces the reluctance in the magnetic path and creates an electromagnetic torque in the airgap.

The various SRMs disclosed herein have a symmetrical configuration for an electrical phase count of three or higher. In other words, the SRMs disclosed herein provide a symmetrical and evenly distributed stator and rotor pole construction.

In some embodiments, the SRMs disclosed herein have only one type of salient pole on the stator. In some additional embodiments, the SRMs disclosed herein have only one type of salient pole on the rotor. In various embodiments, the SRMs disclosed herein have a single-teeth-per pole type construction. In various embodiments, the SRMs disclosed herein have concentrated windings wound around each stator pole.

The various embodiments of SRMs disclosed herein may provide various advantages over conventional SRMs. Such advantages may include low manufacturing costs, low torque ripple, high torque density, low implementation costs, etc. For example, for the same number of phases, the SRM configurations with odd pole-phase index disclosed herein can provide different number of strokes in one revolution as compared to conventional SRM configurations. By increasing the number of rotor poles, the number of strokes per revolution can be increased, which may result in lower torque pulsations. This may further provide the advantages of smooth operation, higher torque density, and lower torque ripple. The various embodiments of SRMs disclosed herein can have different modal orders which may enable improvements in acoustic noise and vibration.

In the various SRM embodiments illustrated herein, the center of axis of each stator pole, such as each stator pole 205a-205l of FIG. 2, and each rotor pole, such as each rotor pole 210a-210h of FIG. 2, stands at a certain mechanical angle. Considering the symmetric and even distribution of stator and rotor poles, the mechanical angle, referred to herein as "pole pitch", is defined as equations (1) and (2) below.

$$T_{pr} = \frac{360}{N_r}, \theta_r[t] = T_{pr}(t-1), t = 1, 2, \ldots, N_r \quad (1)$$

$$T_{ps} = \frac{360}{N_s}, \theta_s[p] = T_{ps}(p-1), p = 1, 2, \ldots, N_s \quad (2)$$

where $T_{pr}$ and $T_{ps}$ are the pole pitch, $N_r$ and $N_s$ are the number of poles for the rotor and stator, and $\theta_r[t]$ and $\theta_s[p]$ are the mechanical angles for each rotor and stator pole, respectively.

As illustrated in FIG. 2, stator pole 205a has a mechanical angle of 0°, stator pole 205b has a mechanical angle of 30°, stator pole 205c has a mechanical angle of 60°, stator pole 205d has a mechanical angle of 90°, stator pole 205e has a mechanical angle of 120°, stator pole 205f has a mechanical angle of 150°, stator pole 205g has a mechanical angle of 180°, stator pole 205h has a mechanical angle of 210°, stator pole 205i has a mechanical angle of 240°, stator pole 205j has a mechanical angle of 270°, stator pole 205k has a mechanical angle of 300°, and stator pole 205l has a mechanical angle of 330°.

Similarly, rotor pole 210a has a mechanical angle of 0°, rotor pole 210b has a mechanical angle of 45°, rotor pole 210c has a mechanical angle of 90°, rotor pole 210d has a mechanical angle of 135°, rotor pole 210e has a mechanical angle of 180°, rotor pole 210f has a mechanical angle of 225°, rotor pole 210g has a mechanical angle of 270°, and rotor pole 210h has a mechanical angle of 315°.

Similarly, in the embodiment of FIG. 3, the stator pole 305a has a mechanical angle of 0°, stator pole 305b has a mechanical angle of 60°, stator pole 305c has a mechanical angle of 120°, stator pole 305d has a mechanical angle of 180°, stator pole 305e has a mechanical angle of 240°, and stator pole 305f has a mechanical angle of 300°. Similarly, rotor pole 310a has a mechanical angle of 0°, rotor pole 310b has a mechanical angle of 36°, rotor pole 310c has a mechanical angle of 72°, rotor pole 310d has a mechanical angle of 108°, rotor pole 310e has a mechanical angle of 144°, rotor pole 310f has a mechanical angle of 180°, rotor pole 310g has a mechanical angle of 216°, rotor pole 310h has a mechanical angle of 252°, rotor pole 310i has a mechanical angle of 288°, and rotor pole 310j has a mechanical angle of 324°.

The mechanical positions are next illustrated with reference to FIG. 4. As illustrated in FIG. 4, the stator pole 405a has a mechanical angle of 0°, stator pole 405b has a mechanical angle of 15°, stator pole 405c has a mechanical angle of 30°, stator pole 405d has a mechanical angle of 45°, stator pole 405e has a mechanical angle of 60°, stator pole 405f has a mechanical angle of 75°, stator pole 405g has a mechanical angle of 90°, stator pole 405h has a mechanical angle of 105°, stator pole 405i has a mechanical angle of 120°, stator pole 405j has a mechanical angle of 135°, a stator pole 405k has a mechanical angle of 150°, a stator pole 405l has a mechanical angle of 165°, a stator pole 405m has a mechanical angle of 180°, a stator pole 405n has a mechanical angle of 195°, a stator pole 405o has a mechanical angle of 210°, a stator pole 405p has a mechanical angle of 225°, a stator pole 405q has a mechanical angle of 240°, a stator pole 405r has a mechanical angle of 255°, a stator pole 405s has a mechanical angle of 270°, a stator pole 405t has a mechanical angle of 285°, a stator pole 405u has a mechanical angle of 300°, a stator pole 405v has a mechanical angle of 315°, a stator pole 405w has a mechanical angle of 330° and a stator pole 405x has a mechanical angle of 345°.

As also illustrated in FIG. 4, rotor pole 410a has a mechanical angle of 0°, rotor pole 410b has a mechanical angle of 20°, rotor pole 410c has a mechanical angle of 40°, rotor pole 410d has a mechanical angle of 60°, rotor pole 410e has a mechanical angle of 80°, rotor pole 410f has a mechanical angle of 100°, rotor pole 410g has a mechanical angle of 120°, rotor pole 410h has a mechanical angle of 140°, rotor pole 410i has a mechanical angle of 160°, rotor pole 410j has a mechanical angle of 180°, rotor pole 410k has a mechanical angle of 200°, rotor pole 410l has a mechanical angle of 220°, rotor pole 410m has a mechanical angle of 240°, rotor pole 410n has a mechanical angle of 260°, rotor pole 410o has a mechanical angle of 280°, rotor pole 410p has a mechanical angle of 300°, rotor pole 410q has a mechanical angle of 320°, and rotor pole 410r has a mechanical angle of 340°.

In the various embodiments of SRMs illustrated herein, the torque profiles of the SRMs depend on the relative position between the stator poles and the rotor poles. Depending on the number of rotor and stator poles, each stator pole has a certain electrical position. As illustrated in FIG. 3, stator pole 305a has an electrical position of 180°, stator pole 305b has an electrical position of 300°, stator pole 305c has an electrical position of 60°, stator pole 305d has an electrical position of 180°, stator pole 305e has an electrical position of 300°, and stator pole 305f has an electrical position of 60°, considering counter clockwise rotation.

As previously mentioned, in the various embodiments illustrated herein, coils are wound around the stator poles. If the coils with the same electrical position are excited with the same current, the poles generate the same torque and the stator poles associated with those electrical positions make up a phase. In the illustrated embodiment of FIG. 3, stator pole pair 305a and 305d, stator pole pair 305b and 305e, and stator pole pair 305c and 305f share the same electrical position, and accordingly, make up a phase respectively.

In the various embodiments illustrated herein, an electrical cycle is defined when a rotor moves from a position, where a certain stator pole is in the middle of two consecutive rotor poles, to a next similar position. In the illustrated embodiment of FIG. 3, an electrical cycle is defined where rotor 310 moves from a position (where a certain stator pole, such as, for example, second stator pole 305b, is in the middle of two consecutive rotor poles, such as second rotor poles 301b and third rotor pole 310c) to a next similar position.

Depending on the number of rotor and stator poles, each stator pole has a certain electrical position at a given position of the rotor. This can be an aligned position, which corresponds to 180° electrical, an unaligned position, which corresponds to 0° electrical, somewhere before the alignment, which corresponds to <180° electrical, or somewhere after the alignment, which corresponds to >180° electrical.

As illustrated in FIG. 3, the rotor poles are at a certain electrical angle for a given mechanical position. For example, the first rotor pole 310a is aligned with the first stator pole 305a, which corresponds to 180° electrical. Similarly, the sixth rotor pole 310f is aligned with the fourth stator pole 305d, which corresponds to 180° electrical. The difference in the mechanical angle between these stator poles 305a, 305d and rotor poles 310a, 310f, respectively, is zero.

In one mechanical revolution, the relative mechanical position between a certain rotor pole and a certain stator pole repeats itself only once. However, considering the other rotor poles, the same relative position repeats itself as frequently as the number of rotor poles for a certain stator pole. In other words, in one mechanical revolution, the electrical angle varies as fast as the number of rotor poles than the mechanical angle. In the illustrated embodiment of FIG. 3, for the first stator pole 305a, when the rotor 310 rotates by the rotor pole pitch, i.e. 36° in counter clockwise direction, the tenth rotor pole 310j will be aligned with the first stator pole 305a, which is still 180° electrical for the first stator pole 305a. The electrical angle for the first stator pole 305a is calculated using equation (3).

$$N_s\#1_{elect} = (N_s\#1_{mech} - N_r\#1_{mech})N_r + 180° \quad (3)$$

where $N_s\#1_{elect}$ is the electrical angle for the first stator pole 305a, $N_s\#1_{mech}$ and $N_r\#1_{mech}$ are the mechanical angles for the first stator pole 305a and the first rotor pole 310a, respectively. 180° is added because the first rotor pole 310a is aligned with the first stator pole 305a at the initial position.

Similar to mechanical position, electrical angle also has 360° cycle. In embodiments illustrated herein, wherein the SRM configuration is symmetric and the pole pitch between each rotor pole is a constant, the electrical angle for the stator poles is calculated using equation (4). For a given stator pole, equation (4) will result in the same value for all the rotor poles at a given position.

$$N_{s\_elect} = \mod((N_{s\_mech} - N_{r\_mech})N_r + 180°, 360) \quad (4)$$

$N_{s\_elect}$ is the electrical position of a stator pole, $N_{s\_mech}$ is the mechanical position of the stator pole, and $N_{r\_mech}$ is the mechanical position of the rotor pole.

In the illustrated embodiment of FIG. 3, if the third stator pole 305c and sixth stator pole 305f are energized at the same time, the rotor 310 starts rotating counter clockwise. When the fourth rotor pole 310d and the ninth rotor pole 310i are aligned with the third stator pole 305c and sixth stator pole 305f, the rotor rotates 12° mechanical. Then the second rotor pole 310b and the seventh rotor pole 310g are at 60° electrical with respect to the second stator pole 305b and the fifth stator pole 305e, respectively. By exciting the second stator pole 305b and the fifth stator pole 305e before the alignment of the fourth rotor pole 310d and the ninth rotor pole 310i with the third stator pole 305c and sixth stator pole 305f, respectively, continuous torque production is maintained in counter clockwise direction.

As illustrated, the stator pole pairs, the first 305a and fourth 305d stator poles at 180° electrical, the second 305b and fifth 305e stator poles at 300° electrical, and the third 305c and sixth 305f stator poles at 60° electrical, always have the same electrical position to each other but different from other stator pole pairs. When the same current is applied at the same instant, these poles create the same torque on the opposite corners of a central bore of the SRM. This is accomplished by connecting the coils of these stator pole pairs in the same electrical circuit, which creates the phases. As illustrated, the SRM 300 is a three-phase machine.

The electrical angles are next illustrated with reference to FIGS. 2 and 4. In the embodiment of FIG. 2, each stator pole 205a-205l has a corresponding electrical position. Stator pole 205a has an electrical position of 180°, stator pole 205b has an electrical position of 300°, stator pole 205c has an electrical position of 60°, stator pole 205d has an electrical position of 180°, stator pole 205e has an electrical position of 300°, stator pole 205f has an electrical position of 60°, stator pole 205g has an electrical position of 180°, stator pole 205h has an electrical position of 300°, stator pole 205i has an electrical position of 60°, stator pole 205j has an electrical position of 180°, stator pole 205k has an electrical position of 300° and stator pole 205l has an electrical position of 60°. In this embodiment, the stator poles 205a, 205d, 205g and 205j form a first phase, stator poles 205b, 205e, 205h and 205k form a second phase, and stator poles 205c, 205f, 205i and 205l form a third phase of the SRM.

Similarly, in the illustrated embodiment of FIG. 4, the stator poles 405a-405x have corresponding electrical positions, where stator pole 405a has an electrical position of 180°, stator pole 405b has an electrical position of 270°, stator pole 405c has an electrical position of 0°, stator pole 405d has an electrical position of 90°, stator pole 405e has an electrical position of 180°, stator pole 405f has an electrical position of 270°, stator pole 405g has an electrical position of 0°, stator pole 405h has an electrical position of 90°, stator pole 405i has an electrical position of 180°, stator pole 405j has an electrical position of 270°, a stator pole 405k has an electrical position of 0°, a stator pole 405l has an electrical position of 90°, a stator pole 405m has an electrical position of 180°, a stator pole 405n has an electrical position of 270°, a stator pole 405o has an electrical position of 0°, a stator pole 405p has an electrical position of 90°, a stator pole 405q has an electrical position of 180°, a stator pole 405r has an electrical position of 270°, a stator pole 405s has an electrical position of 0°, a stator pole 405t has an electrical position of 90°, a stator pole 405u has an electrical position of 180°, a stator pole 405v has an electrical position of 270°, a stator pole 405w has an electrical position of 0° and a stator pole 405x has an electrical position of 90°. In this embodiment, the stator poles 405a, 405e, 405i, 405m, 405q and 405u form a first phase, stator poles 405b, 405f, 405j, 405n, 405r and 405v form a second phase, stator poles 405c, 405g, 405k, 405o, 405s and 405w form a third phase, and stator poles 405d, 405h, 405l, 405p, 405t and 405x form a fourth phase of the SRM.

Reference is next made to FIGS. 5-11, which illustrate example embodiments of SRMs according to the teachings herein. In the family of SRMs disclosed herein, the pole-phase index or the number of stator poles per phase is an odd number. In addition, in the family of SRMs disclosed herein, the number of rotor poles of the SRMs is determined so that the number of stator poles defined by the pole-phase index share the same electrical angle and, hence, constitute a phase.

For a given number of phases, pole-phase index and configuration index, the following equation, equation (5), is used to derive the number of rotor poles and accordingly, the configuration of the SRMs. Equation (5) can also be used in the process for manufacturing SRMs.

$$N_r = \begin{cases} \left(\frac{N_s}{m}\right) k \operatorname{ceil}\left(\frac{\mod(k, m)}{m}\right), m \in I_{odd}^+, \left(\frac{N_s}{m}\right) \in I_{odd}^+, \\ k = \left\{\frac{m+1}{2}, \frac{m+1}{2}+1, \frac{m+1}{2}+2, \ldots\right\} \\ \left(\frac{N_s}{m}\right) k \operatorname{ceil}\left(\frac{\mod\left(k, \frac{m}{2}\right)}{\frac{m}{2}}\right), m \in I_{even}^+, \left(\frac{N_s}{m}\right) \in I_{odd}^+, \\ k = \left\{\frac{m+2}{2}, \frac{m+2}{2}+1, \frac{m+2}{2}+2, \ldots\right\} \end{cases} \quad (5)$$

where $$\left(\frac{N_s}{m}\right)$$

is the pole-phase index and is expressed as the ratio between the number of stator poles to the number of phases, m is the number of phases, and k is the configuration index.

As previously mentioned, in the family of SRMs disclosed herein, the pole-phase index $$\left(\frac{N_s}{m}\right)$$

is an element of odd positive integers $I_{odd}^+$. In the various embodiments illustrated herein, the number of phases, m, can be either an even or an odd number. And, in various embodiments illustrated herein, k is the configuration index and it defines the number of rotor poles for the given number of stator poles and phases in the SRMs.

In various embodiments illustrated herein, for a different number of phases, the configuration index has different ranges resulting in different configurations of SRMs. Configuration index, k, can have any value within the given range. The initial values, $$\frac{m+1}{2}$$

for odd number of phases and $$\frac{m+2}{2}$$

for even number of phases, define the smallest number of rotor poles available for a given pole-phase index according to the various embodiments herein.

In equation (5), the "ceil" function acts as the selective part, which forces the results to be zero for the configurations that would not work in the family of SRMs disclosed herein. For a given configuration index and pole-phase index, if the calculated number of rotor poles does not create symmetry, the "ceil" function results in zero to signify that the selected configuration does not provide a symmetric design.

This is illustrated by way of the following examples. For pole-phase index of 3 in a three-phase SRM, the configuration indexes 4 and 5 provide a symmetric machine, whereas configuration index 6 does not. Therefore, k=4=>mod(k,m)=mod(4,3)=1 k=5=>mod(k,m)=mod(5,3)=2 k=6=>mod(k,m)=mod(6,3)=0

In equation (5), when mod(k,m) is divided by m and then rounded up by the "ceil" function, the output will be 1 if mod(k,m) is not zero and this signifies that the number of rotor poles, calculated for the given pole-phase index and configuration index is a part of the family of SRMs disclosed herein. The same approach applies for the even number of phases if m is replaced by m/2.

Table I illustrates examples of SRM configurations and number of rotor poles for different combinations of pole-phase index, configuration index and number of stator poles when the number of phases, m=3.

TABLE I

Rotor Pole Count and SRM Configurations for m = 3

| number of phases (m) | pole-phase index (Ns/m) | configuration index (k) | number of stator poles (Ns) | number of rotor poles (Nr) | SRM |
|---|---|---|---|---|---|
| 3 | 3 | 2 | 9 | 6 | 9/6 |
|   |   | 4 | 9 | 12 | 9/12 |
|   |   | 5 | 9 | 15 | 9/15 |
|   |   | 7 | 9 | 21 | 9/21 |
|   |   | 8 | 9 | 24 | 9/24 |
|   | 5 | 2 | 15 | 10 | 15/10 |
|   |   | 4 | 15 | 20 | 15/20 |
|   |   | 5 | 15 | 25 | 15/25 |
|   |   | 7 | 15 | 35 | 15/35 |
|   |   | 8 | 15 | 40 | 15/40 |
|   | 7 | 2 | 21 | 14 | 21/14 |
|   |   | 4 | 21 | 28 | 21/28 |
|   |   | 5 | 21 | 35 | 21/35 |
|   |   | 7 | 21 | 49 | 21/49 |
|   |   | 8 | 21 | 56 | 21/56 |
|   | 9 | 2 | 27 | 18 | 27/18 |
|   |   | 4 | 27 | 36 | 27/36 |
|   |   | 5 | 27 | 45 | 27/45 |
|   |   | 7 | 27 | 63 | 27/63 |
|   |   | 8 | 27 | 72 | 27/72 |

Table II illustrates examples of SRM configurations and number of rotor poles for different combinations of pole-phase index, configuration index and number of stator poles when the number of phases, m=4.

TABLE II

Rotor Pole Count and SRM Configurations for m = 4

| number of phases (m) | pole-phase index (Ns/m) | configuration index (k) | number of stator poles (Ns) | number of rotor poles (Nr) | SRM |
|---|---|---|---|---|---|
| 4 | 3 | 3 | 12 | 9 | 12/9 |
|   |   | 5 | 12 | 15 | 12/15 |
|   |   | 7 | 12 | 21 | 12/21 |
|   |   | 9 | 12 | 27 | 12/27 |
|   |   | 11 | 12 | 33 | 12/33 |
|   | 5 | 3 | 20 | 15 | 20/15 |
|   |   | 5 | 20 | 25 | 20/25 |
|   |   | 7 | 20 | 35 | 20/35 |
|   |   | 9 | 20 | 45 | 20/45 |
|   |   | 11 | 20 | 55 | 20/55 |
|   | 7 | 3 | 28 | 21 | 28/21 |
|   |   | 5 | 28 | 35 | 28/35 |
|   |   | 7 | 28 | 49 | 28/49 |
|   |   | 9 | 28 | 63 | 28/63 |
|   |   | 11 | 28 | 77 | 28/77 |
|   | 9 | 3 | 36 | 27 | 36/27 |
|   |   | 5 | 36 | 45 | 36/45 |
|   |   | 7 | 36 | 63 | 36/63 |
|   |   | 9 | 36 | 81 | 36/81 |
|   |   | 11 | 36 | 99 | 36/99 |

Table III illustrates examples of SRM configurations and number of rotor poles for different combinations of pole-phase index, configuration index and number of stator poles when the number of phases, m=5.

TABLE III

Rotor Pole Count and SRM Configurations for m = 5

| number of phases (m) | pole-phase index (Ns/m) | configuration index (k) | number of stator poles (Ns) | number of rotor poles (Nr) | SRM |
|---|---|---|---|---|---|
| 5 | 3 | 3 | 15 | 9 | 15/9 |
|   |   | 4 | 15 | 12 | 15/12 |
|   |   | 6 | 15 | 18 | 15/18 |
|   |   | 7 | 15 | 21 | 15/21 |
|   |   | 8 | 15 | 24 | 15/24 |
|   | 5 | 3 | 25 | 15 | 25/15 |
|   |   | 4 | 25 | 20 | 25/20 |
|   |   | 6 | 25 | 30 | 25/30 |
|   |   | 7 | 25 | 35 | 25/35 |
|   |   | 8 | 25 | 40 | 25/40 |
|   | 7 | 3 | 35 | 21 | 35/21 |
|   |   | 4 | 35 | 28 | 35/28 |
|   |   | 6 | 35 | 42 | 35/42 |
|   |   | 7 | 35 | 49 | 35/49 |
|   |   | 8 | 35 | 56 | 35/56 |
|   | 9 | 3 | 45 | 27 | 45/27 |
|   |   | 4 | 45 | 36 | 45/36 |
|   |   | 6 | 45 | 54 | 45/54 |
|   |   | 7 | 45 | 63 | 45/63 |
|   |   | 8 | 45 | 72 | 45/72 |

Table IV illustrates examples of SRM configurations and number of rotor poles for different combinations of pole-phase index, configuration index and number of stator poles when the number of phases, m=6.

TABLE IV

Rotor Pole Count and SRM Configurations for m = 6

| number of phases (m) | pole-phase index (Ns/m) | configuration index (k) | number of stator poles (Ns) | number of rotor poles (Nr) | SRM |
|---|---|---|---|---|---|
| 6 | 3 | 4 | 18 | 12 | 18/12 |
|   |   | 5 | 18 | 15 | 18/15 |
|   |   | 7 | 18 | 21 | 18/21 |
|   |   | 8 | 18 | 24 | 18/24 |
|   |   | 10 | 18 | 30 | 18/30 |
|   | 5 | 4 | 30 | 20 | 30/20 |
|   |   | 5 | 30 | 25 | 30/25 |
|   |   | 7 | 30 | 35 | 30/35 |
|   |   | 8 | 30 | 40 | 30/40 |
|   |   | 10 | 30 | 50 | 30/50 |
|   | 7 | 4 | 42 | 28 | 42/28 |
|   |   | 5 | 42 | 35 | 42/35 |
|   |   | 7 | 42 | 49 | 42/49 |
|   |   | 8 | 42 | 56 | 42/56 |
|   |   | 10 | 42 | 70 | 42/70 |
|   | 9 | 4 | 54 | 36 | 54/36 |
|   |   | 5 | 54 | 45 | 54/45 |
|   |   | 7 | 54 | 63 | 54/63 |
|   |   | 8 | 54 | 72 | 54/72 |
|   |   | 10 | 54 | 90 | 54/90 |

Table V illustrates examples of SRM configurations and number of rotor poles for different combinations of pole-phase index, configuration index and number of stator poles when the number of phases, m=7.

TABLE V

Rotor Pole Count and SRM Configurations for m = 7

| number of phases (m) | pole-phase index (Ns/m) | configuration index (k) | number of stator poles (Ns) | number of rotor poles (Nr) | SRM |
|---|---|---|---|---|---|
| 7 | 3 | 4 | 21 | 12 | 21/12 |
|   |   | 5 | 21 | 15 | 21/15 |
|   |   | 6 | 21 | 18 | 21/18 |
|   |   | 8 | 21 | 24 | 21/24 |
|   |   | 9 | 21 | 27 | 21/27 |
|   | 5 | 4 | 35 | 20 | 35/20 |
|   |   | 5 | 35 | 25 | 35/25 |
|   |   | 6 | 35 | 30 | 35/30 |
|   |   | 8 | 35 | 40 | 35/40 |
|   |   | 9 | 35 | 45 | 35/45 |
|   | 7 | 4 | 49 | 28 | 49/28 |
|   |   | 5 | 49 | 35 | 49/35 |
|   |   | 6 | 49 | 42 | 49/42 |
|   |   | 8 | 49 | 56 | 49/56 |
|   |   | 9 | 49 | 63 | 49/63 |
|   | 9 | 4 | 63 | 36 | 63/36 |
|   |   | 5 | 63 | 45 | 63/45 |
|   |   | 6 | 63 | 54 | 63/54 |
|   |   | 8 | 63 | 72 | 63/72 |
|   |   | 9 | 63 | 81 | 63/81 |

Table VI illustrates examples of SRM configurations and number of rotor poles for different combinations of pole-phase index, configuration index and number of stator poles when the number of phases, m=8.

TABLE VI

Rotor Pole Count and SRM Configurations for m = 8

| number of phases (m) | pole-phase index (Ns/m) | configuration index (k) | number of stator poles (Ns) | number of rotor poles (Nr) | SRM |
|---|---|---|---|---|---|
| 8 | 3 | 5 | 24 | 15 | 24/15 |
|   |   | 6 | 24 | 18 | 24/18 |
|   |   | 7 | 24 | 21 | 24/21 |
|   |   | 9 | 24 | 27 | 24/27 |
|   |   | 10 | 24 | 30 | 24/30 |
|   | 5 | 5 | 40 | 25 | 40/25 |
|   |   | 6 | 40 | 30 | 40/30 |
|   |   | 7 | 40 | 35 | 40/35 |
|   |   | 9 | 40 | 45 | 40/45 |
|   |   | 10 | 40 | 50 | 40/50 |
|   | 7 | 5 | 56 | 35 | 56/35 |
|   |   | 6 | 56 | 42 | 56/42 |
|   |   | 7 | 56 | 49 | 56/49 |
|   |   | 9 | 56 | 63 | 56/63 |
|   |   | 10 | 56 | 70 | 56/70 |
|   | 9 | 5 | 72 | 45 | 72/45 |
|   |   | 6 | 72 | 54 | 72/54 |
|   |   | 7 | 72 | 63 | 72/63 |
|   |   | 9 | 72 | 81 | 72/81 |
|   |   | 10 | 72 | 90 | 72/90 |

Figure 5:
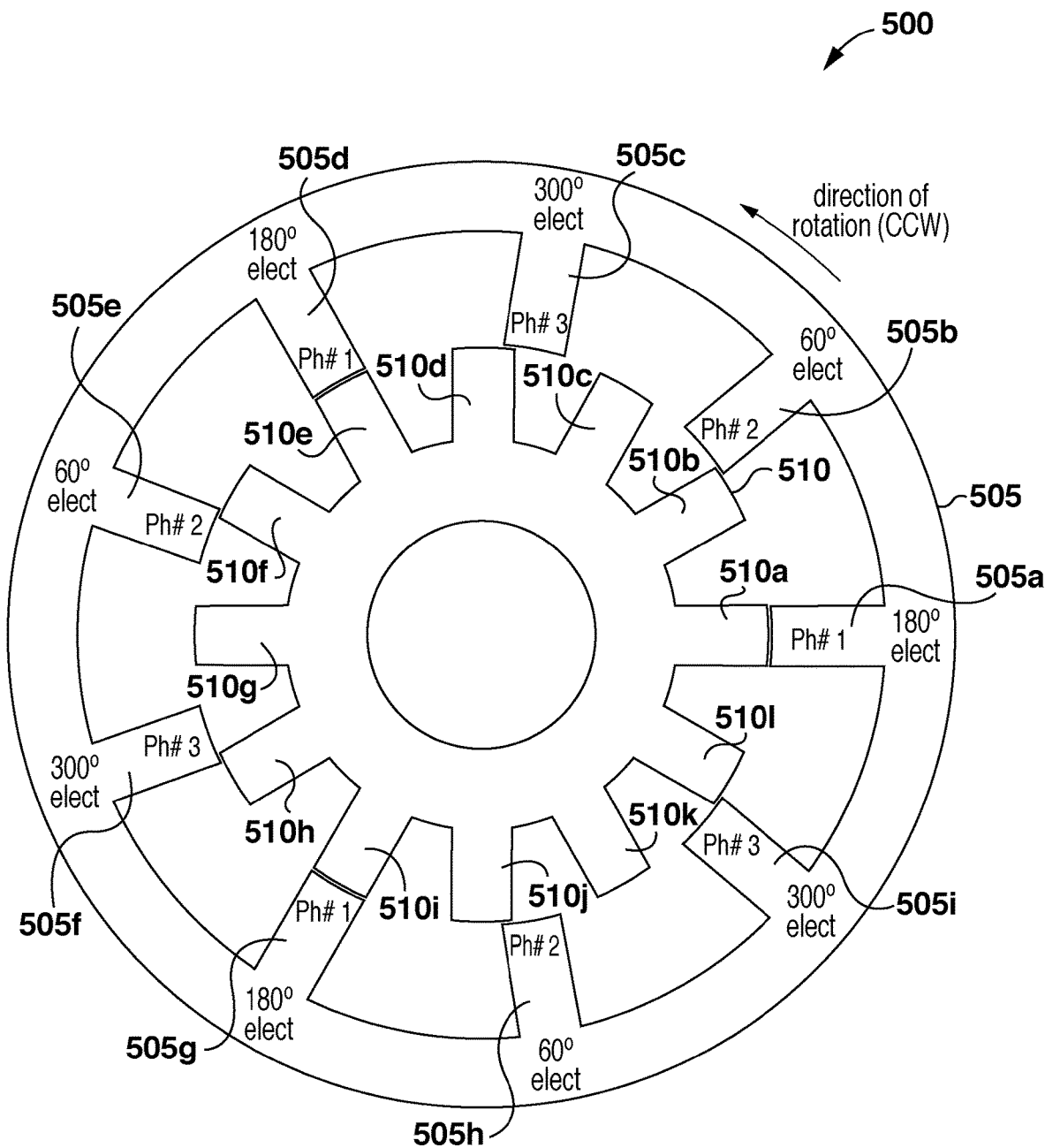
FIG. 5 illustrates a three-phase 9/12 switched reluctance machine according to an example embodiment.

Reference is next made to FIG. 5, which illustrates a cross-sectional view of a three-phase 9/12 SRM 500 according to an example embodiment. Using equation (5), the number of rotor poles and the configuration of the SRM 500, which has three phases and nine stator poles, can be verified.

In this embodiment, the SRM 500 has a pole-phase index of 3, which $\in I_{odd}^+$. Equation (5) provides possible values for configuration index, k, including 2, 4, 5, 7, 8 etc. Assuming configuration index value to be 4, and substituting 3 for $$\left(\frac{N_s}{m}\right),$$

equation (5) results in $N_r$=12.

$$N_r = \left(\frac{N_s}{m}\right)k\mathrm{ceil}\left(\frac{\mathrm{mod}(k,m)}{m}\right) =$$
$$3 \times 4\mathrm{ceil}\left(\frac{\mathrm{mod}(4,3)}{3}\right) = 12 \times \mathrm{ceil}\left(\frac{1}{3}\right) = 12 \times 1 = 12$$

As illustrated, the SRM 500 has a stator 505 and a rotor 510 located inside the stator 505. Stator 505 comprises nine stator poles and rotor 510 comprises twelve rotor poles. Accordingly, the 9/12 SRM 500 includes a first stator pole 505a, a second stator pole 505b, a third stator pole 505c, a fourth stator pole 505d, a fifth stator pole 505e, a sixth stator pole 505f, a seventh stator pole 505g, an eighth stator pole 505h and a ninth stator pole 505i. The 9/12 SRM 500 also includes a first rotor pole 510a, a second rotor pole 510b, a third rotor pole 510c, a fourth rotor pole 510d, a fifth rotor pole 510e, a sixth rotor pole 510f, a seventh rotor pole 510g, an eighth rotor pole 510h, a ninth rotor pole 510i, a tenth rotor pole 510j, an eleventh rotor pole 510k, and a twelfth rotor pole 510l.

In the illustrated embodiment, the stator pole 505a has a mechanical angle of 0°, stator pole 505b has a mechanical angle of 40°, stator pole 505c has a mechanical angle of 80°, stator pole 505d has a mechanical angle of 120°, stator pole 505e has a mechanical angle of 160°, and stator pole 505f has a mechanical angle of 200°, stator pole 505g has a mechanical angle of 240°, a stator pole 505h has a mechanical angle of 280° and a stator pole 505i has a mechanical angle of 320°.

Similarly, as illustrated, rotor pole 510a has a mechanical angle of 0°, rotor pole 510b has a mechanical angle of 30°, rotor pole 510c has a mechanical angle of 60°, rotor pole 510d has a mechanical angle of 90°, rotor pole 510e has a mechanical angle of 120°, rotor pole 510f has a mechanical angle of 150°, rotor pole 510g has a mechanical angle of 180°, rotor pole 510h has a mechanical angle of 210°, rotor pole 510i has a mechanical angle of 240°, rotor pole 510j has a mechanical angle of 270°, rotor pole 510k has a mechanical angle of 300°, and a rotor pole 510l has a mechanical angle of 330°.

In the illustrated embodiment, the stator poles 505a-505i have corresponding electrical positions. Stator pole 505a has an electrical position of 180°, stator pole 505b has an electrical position of 60°, stator pole 505c has an electrical position of 300°, stator pole 505d has an electrical position of 180°, stator pole 505e has an electrical position of 60°, stator pole 505f has an electrical position of 300°, stator pole 505g has an electrical position of 180°, stator pole 505h has an electrical position of 60°, and stator pole 505i has an electrical position of 300°.

In this embodiment, stator poles 505a, 505d and 505g form a first phase, stator poles 505b, 505e and 505h form a second phase, and stator poles 505c, 505f and 505i form a third phase of the SRM 500. As illustrated, the number of stator poles which share the same electrical angle in 9/12 SRM 500 is equal to the number of pole-phase index. This maintains a symmetric configuration of SRM 500.

Reference is briefly made to FIG. 2 again to illustrate the magnetic flux distribution in a conventional three-phase 12/8 SRM, which has a pole-phase index of 4 (i.e. four stator poles per phase). In this embodiment, when one of the phases conduct, such as, for example, phase corresponding to stator poles 205a, 205d, 205g and 205j having an electrical angle of 180°, the flux paths 215a, 215b, 215c and 215d cover the entire back material. As illustrated, the flux paths 215a, 215b, 215c and 215d form balanced flux patterns, and the number of flux paths equals the pole-phase index of the SRM.

Similarly, as illustrated in FIG. 3, the magnetic flux paths 315a and 315b result when one of the phases of the three-phase 6/10 SRM conduct. In this embodiment, the number of flux paths, i.e. 2, equals the pole-phase index, also 2, of the SRM. Likewise, as illustrated in FIG. 4, the flux paths 415a, 415b, 415c, 415d, 415e and 415f have a balanced distribution, and the number of flux paths, i.e. 6, equals the pole-phase index, also 6, of the three-phase 24/18 SRM of FIG. 4. In the embodiments illustrated in FIGS. 2, 3 and 4, the coils are wound around the stator poles in a non-coupled configuration. In such configurations, the flux patterns are formed between the stator poles belonging to the same phase and flux pattern connecting to other phases are negligible.

Figure 6:
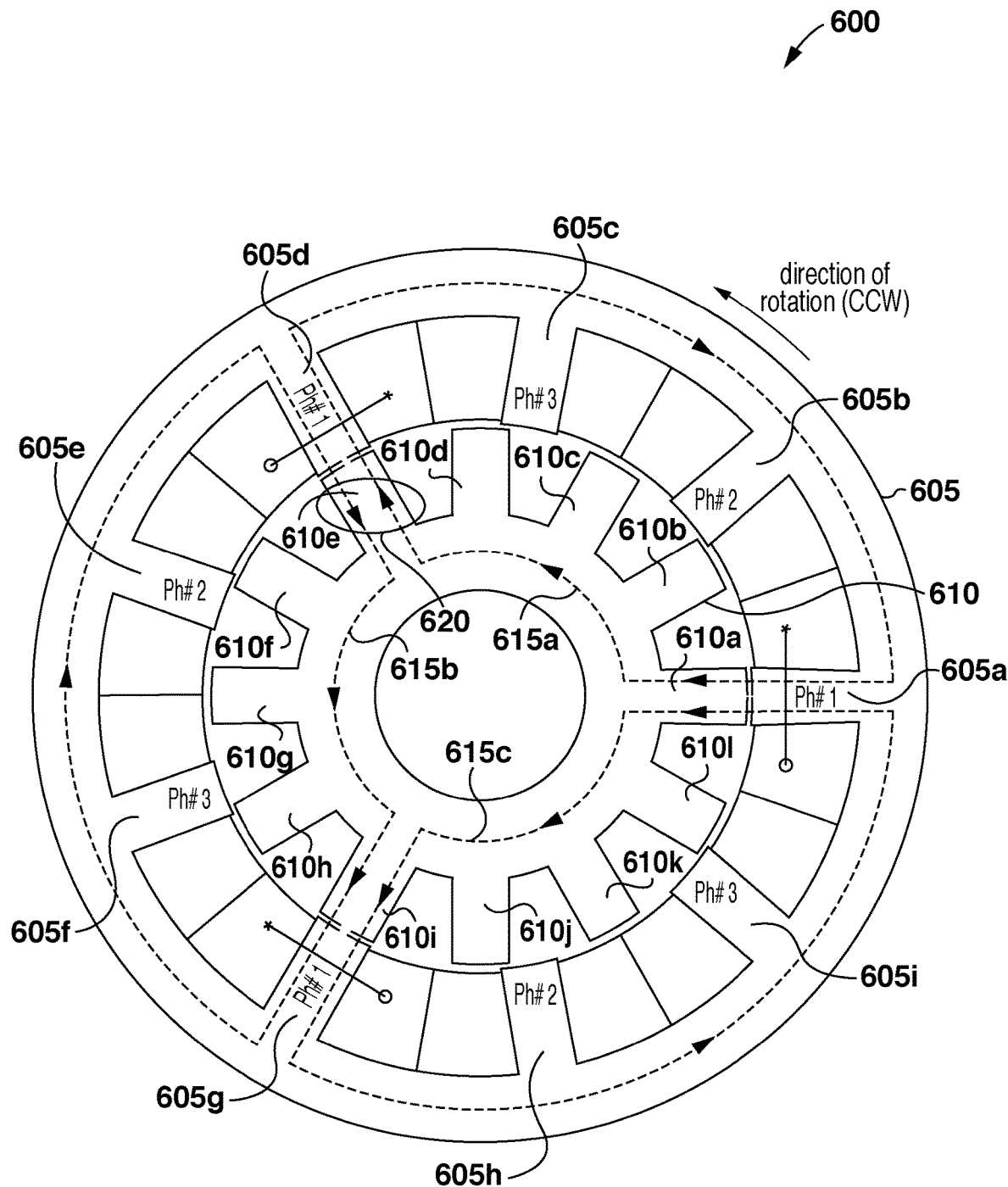
FIG. 6 illustrates a three-phase 9/12 switched reluctance machine according to another example embodiment.

The SRMs of the teachings herein have an odd-phase index but a similar balanced flux pattern is desired. In the embodiment of FIG. 5 illustrating a three-phase 9/12 SRM 500, three balanced flux patterns are desired. FIG. 6 illustrates the flux patterns 615a, 615b and 615c as desired in a three-phase 9/12 SRM.

Reference is made to FIG. 6, which illustrates a three-phase 9/12 SRM 600 according to an example embodiment. As illustrated, SRM 600 is analogous to SRM 500, and comprises a stator 605 and a rotor 610 located inside the stator 605. SRM 600 includes a first stator pole 605a, a second stator pole 605b, a third stator pole 605c, a fourth stator pole 605d, a fifth stator pole 605e, a sixth stator pole 605f, a seventh stator pole 605g, an eighth stator pole 605h and a ninth stator pole 605i. The 9/12 SRM 600 also includes a first rotor pole 610a, a second rotor pole 610b, a third rotor pole 610c, a fourth rotor pole 610d, a fifth rotor pole 610e, a sixth rotor pole 610f, a seventh rotor pole 610g, an eighth rotor pole 610h, a ninth rotor pole 610i, a tenth rotor pole 610j, an eleventh rotor pole 610k, and a twelfth rotor pole 610l.

As illustrated in FIG. 6, the total number of desired flux patterns is three, shown as a first flux pattern 615a, a second flux pattern 615b and a third flux pattern 615c. However, in a non-coupled configuration of stator coils, when the phase corresponding to stator poles 605a, 605d and 605g having an electrical angle of 180° conducts, flux pattern 615b cannot be generated. This is because, as illustrated in region 620, flux pattern 615b can only be generated if the direction of the current flow in the coil around the stator pole 605d is reversed. Since the coil around the stator pole 605d has a certain direction, two flux patterns 615a and 615b having opposite directions cannot be generated at the same time. The realistic flux patterns of the SRM embodiment of FIG. 6, having non-coupled coil configuration, are illustrated with reference to FIG. 7.

Figure 7:
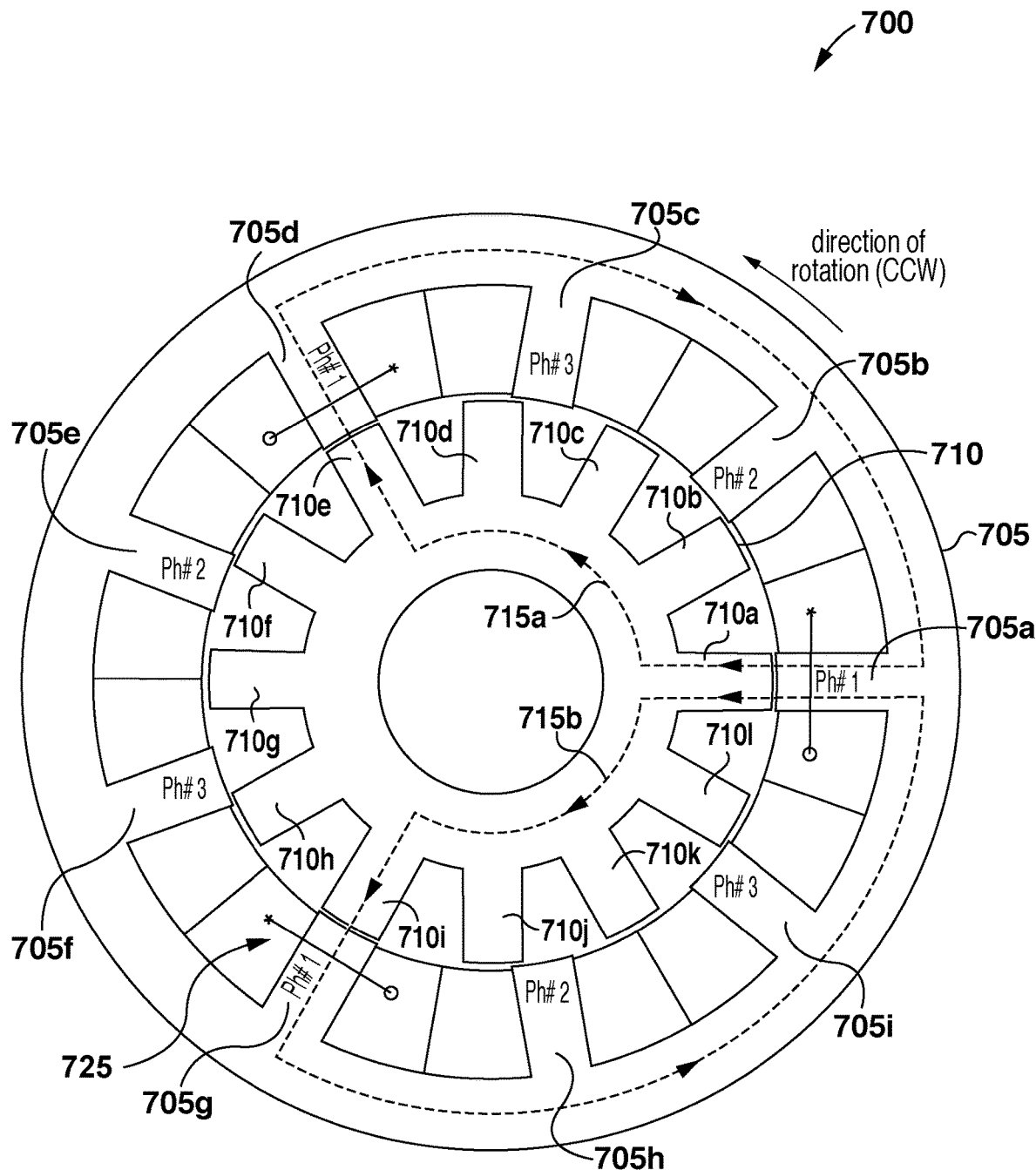
FIG. 7 illustrates a three-phase 9/12 switched reluctance machine according to another example embodiment.

FIG. 7 illustrates a three-phase 9/12 SRM 700 according to an example embodiment. As illustrated, SRM 700 is analogous to SRMs 500 and 600 of FIGS. 5 and 6 respectively, and comprises a stator 705 and a rotor 710 located inside the stator 705. SRM 700 includes a first stator pole 705a, a second stator pole 705b, a third stator pole 705c, a fourth stator pole 705d, a fifth stator pole 705e, a sixth stator pole 705f, a seventh stator pole 705g, an eighth stator pole 705h and a ninth stator pole 705i. The 9/12 SRM 700 also includes a first rotor pole 710a, a second rotor pole 710b, a third rotor pole 710c, a fourth rotor pole 710d, a fifth rotor pole 710e, a sixth rotor pole 710f, a seventh rotor pole 710g, an eighth rotor pole 710h, a ninth rotor pole 710i, a tenth rotor pole 710j, an eleventh rotor pole 710k, and a twelfth rotor pole 710l.

As illustrated in FIG. 7, when a phase corresponding to stator poles having the same electrical position is energized, the flux patterns 715a and 715b result from a non-coupled coil configuration of SRM 700. However, the total number of flux patterns is not equal to the pole-phase index, where the former number is two, and the latter number is three. While an SRM analogous to SRM 700 can operate under this condition, i.e. with imbalanced flux patterns 715a and 715b, this may have the disadvantage of imbalanced torque pulsations around the airgap of the SRM. Accordingly, this embodiment may be undesirable.

Figure 8:
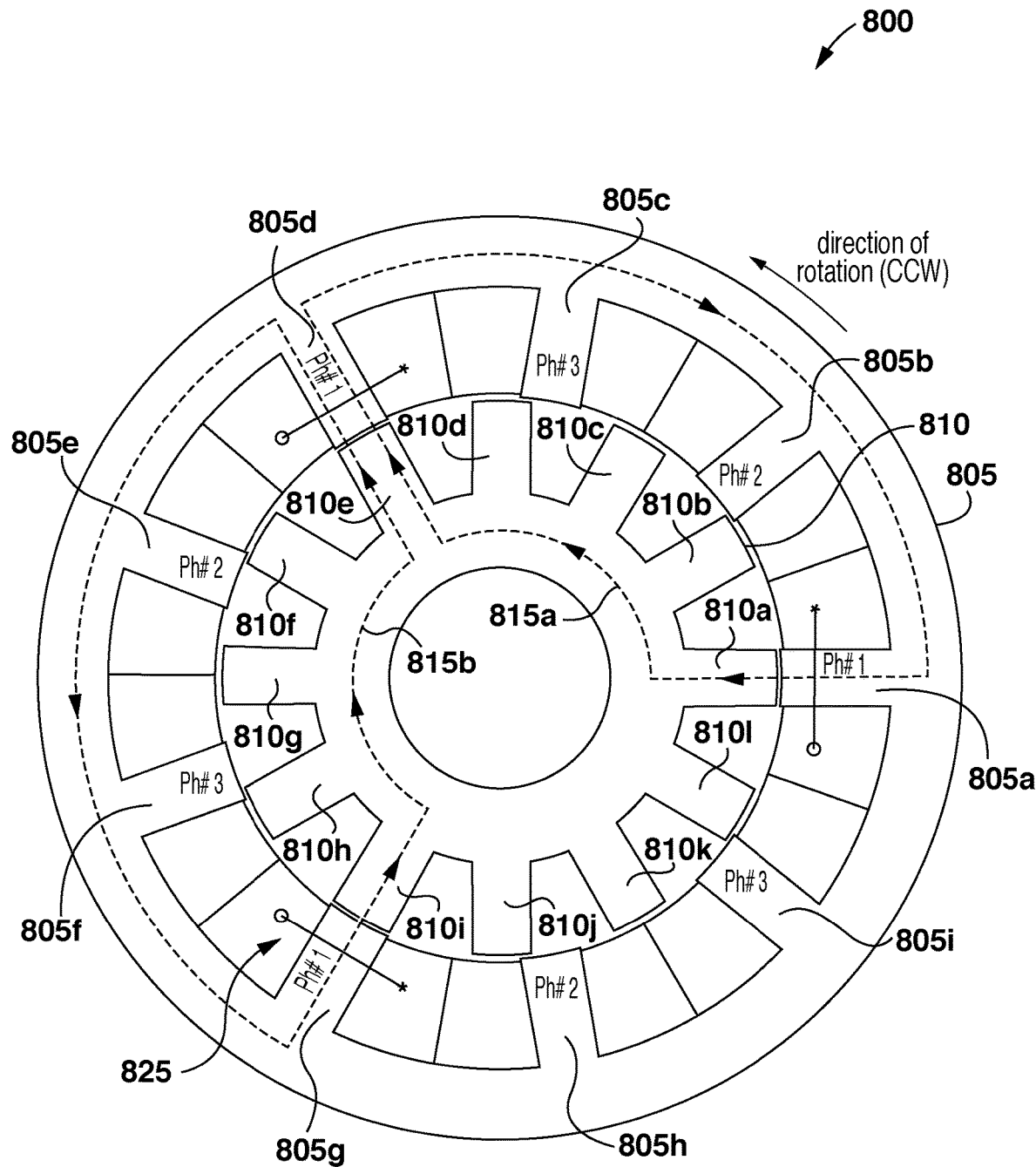
FIG. 8 illustrates a three-phase 9/12 switched reluctance machine according to a further example embodiment.

Reference is next made to FIG. 8, which illustrates a 9/12 SRM 800 according to another example embodiment. SRM 800 is analogous to SRMs 500, 600 and 700 of FIGS. 5, 6 and 7 respectively, and comprises a stator 805 and a rotor 810 located inside the stator 805. SRM 800 includes a first stator pole 805a, a second stator pole 805b, a third stator pole 805c, a fourth stator pole 805d, a fifth stator pole 805e, a sixth stator pole 805f, a seventh stator pole 805g, an eighth stator pole 805h and a ninth stator pole 805i. The 9/12 SRM 800 also includes a first rotor pole 810a, a second rotor pole 810b, a third rotor pole 810c, a fourth rotor pole 810d, a fifth rotor pole 810e, a sixth rotor pole 810f, a seventh rotor pole 810g, an eighth rotor pole 810h, a ninth rotor pole 810i, a tenth rotor pole 810j, an eleventh rotor pole 810k, and a twelfth rotor pole 810l.

In the embodiment of FIG. 8, while the non-coupled coil configuration is maintained, the coil direction 825 for the coils wound around the stator pole 805g is modified in contrast to coil direction 725 for the analogous stator pole 705g of FIG. 7. As illustrated, in this embodiment of FIG. 8 as well, only two flux patterns 815a and 815b result when the phase corresponding to stator poles 805a, 805d and 805g having an electrical angle of 180° is energized. However, similar to the embodiment of FIG. 7, the total number of flux patterns, i.e. 2, is not equal to the pole-phase index, i.e. 3, of the SRM 800. Accordingly, SRM 800 may also suffer from disadvantages of imbalanced torque pulsations around the airgap of the SRM 800.

Figure 9:
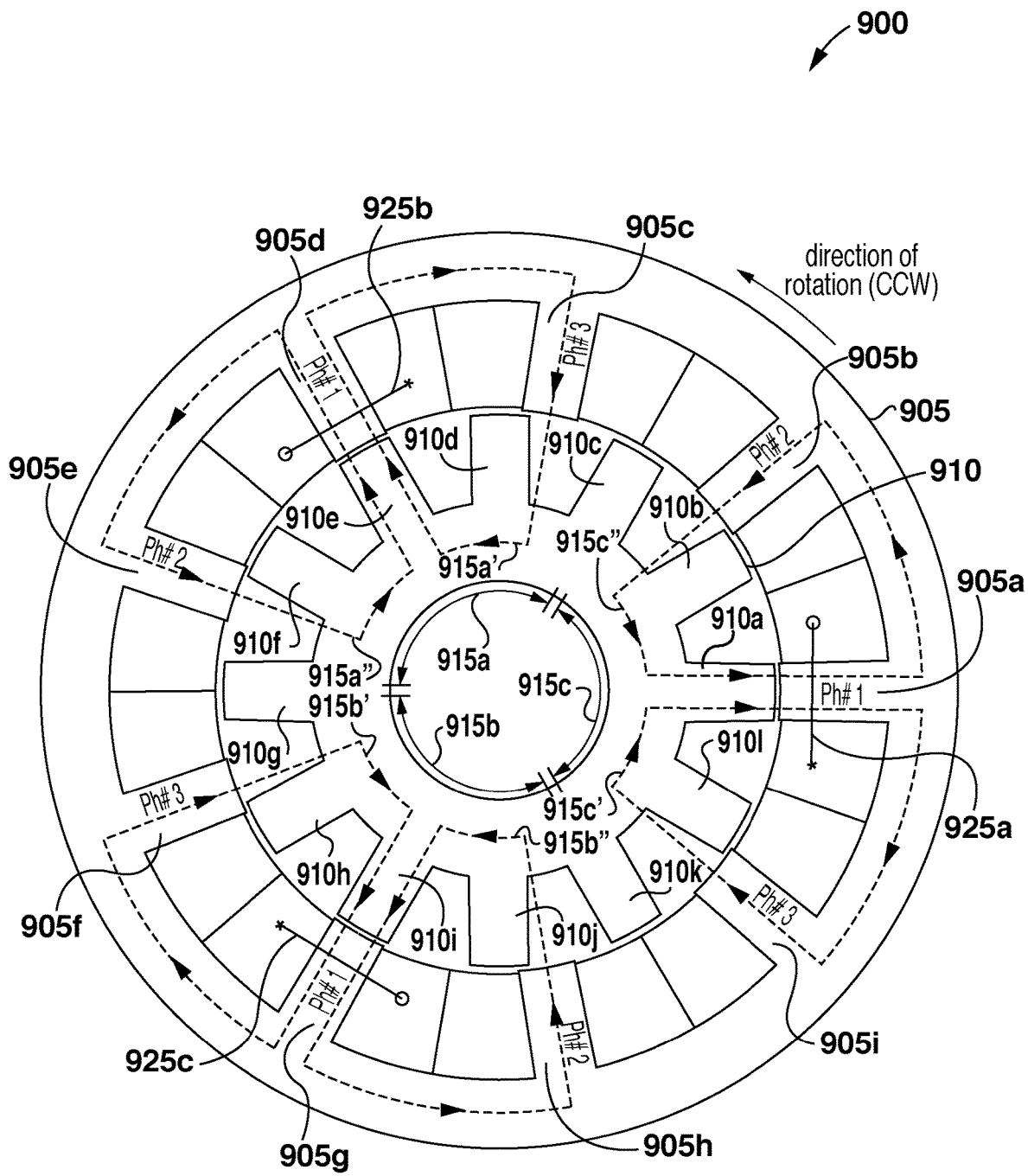
FIG. 9 illustrates a three-phase 9/12 switched reluctance machine according to another example embodiment.

Reference is next made to FIG. 9, which illustrates a three-phase 9/12 SRM 900 according to an example embodiment. SRM 900 is analogous to SRMs 500, 600, 700 and 800 of FIGS. 5, 6, 7, and 8 respectively, and comprises a stator 905 and a rotor 910 located inside the stator 905. SRM 900 includes a first stator pole 905a, a second stator pole 905b, a third stator pole 905c, a fourth stator pole 905d, a fifth stator pole 905e, a sixth stator pole 905f, a seventh stator pole 905g, an eighth stator pole 905h and a ninth stator pole 905i. The 9/12 SRM 900 also includes a first rotor pole 910a, a second rotor pole 910b, a third rotor pole 910c, a fourth rotor pole 910d, a fifth rotor pole 910e, a sixth rotor pole 910f, a seventh rotor pole 910g, an eighth rotor pole 910h, a ninth rotor pole 910i, a tenth rotor pole 910j, an eleventh rotor pole 910k, and a twelfth rotor pole 910l.

In the embodiment of FIG. 9, the SRM 900 comprises mutually coupled coil configuration. In this configuration, the coils wound around the stator poles belonging to the same phase, or having a same electrical position, are all in opposite directions. As illustrated, stator poles 905a, 905d and 905g belonging to the same phase comprise coils 925a, 925b and 925c respectively, where the coils 925a, 925b and 925c are configured in opposite directions. With this configuration, the number of flux patterns generated by energizing a phase of the SRM equals the pole-phase index of the SRM.

As illustrated, when the phase corresponding to stator poles 905a, 905d and 905g is energized, flux patterns 915a, 915b and 915c are generated and are distributed around the back material of the stator 905. Each flux pattern 915a, 915b and 915c, resulting from energizing of one phase of the SRM, comprises flux patterns 915a', 915a'', 915b', 915b'', 915c' and 915c'' linking or connecting to the other phases of the SRM.

In the various embodiments disclosed according to the teachings herein, the coils around the stator poles are configured in a mutually coupled configuration where the flux generated by energizing one phase creates flux linking to the other phases of the SRMs. In these embodiments, the number of flux patterns equals the pole-phase index, which results in a balanced distribution of flux patterns around the stator back material. In the various embodiments illustrated herein, when designing and analyzing the SRMs with the odd pole-phase index and mutually coupled coil configurations, the flux linkages of all phases may need to be calculated or determined.

Figure 10:
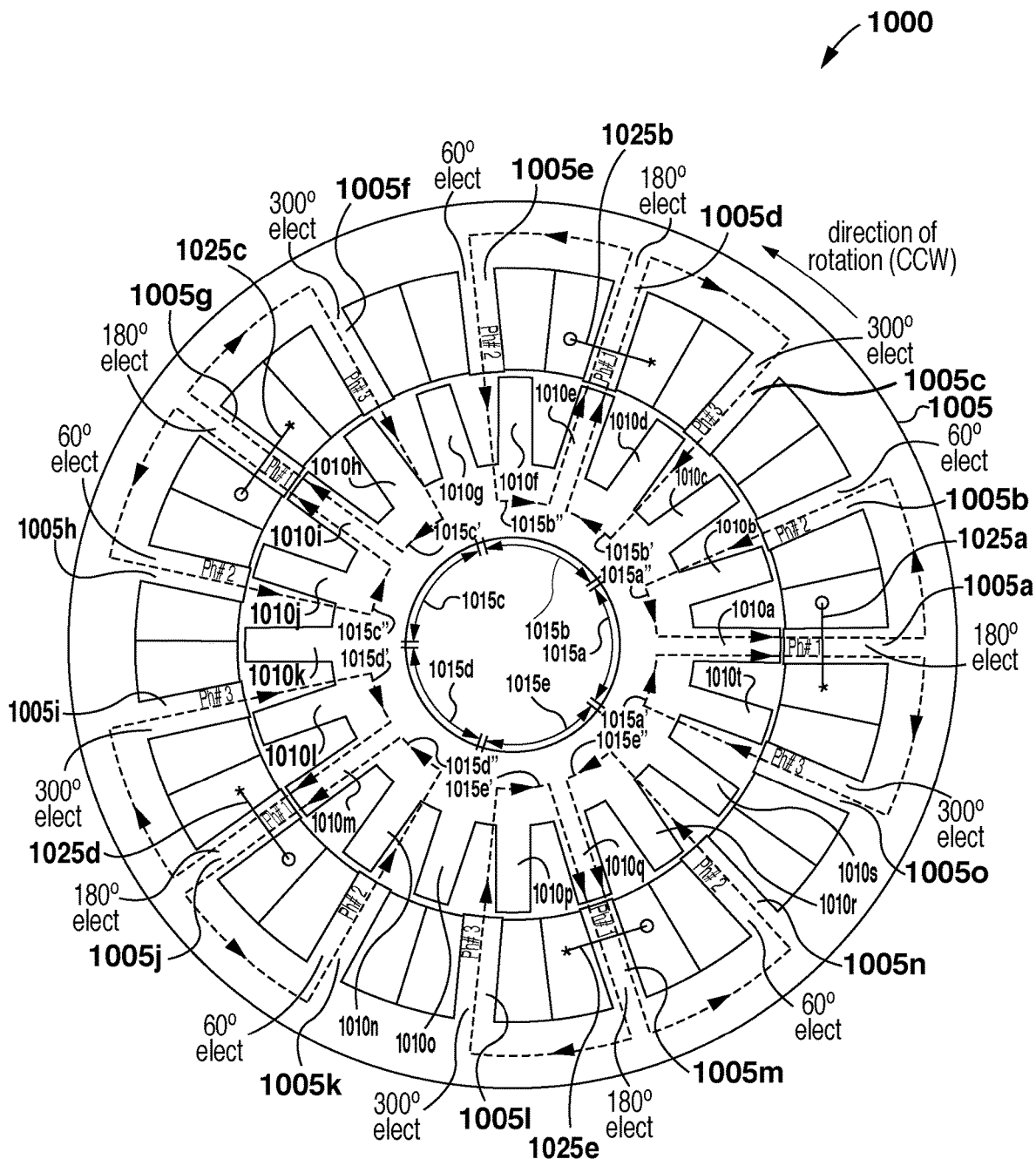
FIG. 10 illustrates a three-phase 15/20 switched reluctance machine according to an example embodiment.

Reference is next made to FIG. 10, which illustrates a cross-sectional view of a three-phase 15/20 SRM 1000 according to an example embodiment. In this embodiment, the pole-phase index is 5 and the configuration index is 4. The SRM 1000 illustrated herein has a stator 1005 and a rotor 1010 located inside the stator 1005. Stator 1005 comprises fifteen stator poles and rotor 1010 comprises twenty rotor poles. Accordingly, the 15/20 SRM 1000 includes a first stator pole 1005a, a second stator pole 1005b, a third stator pole 1005c, a fourth stator pole 1005d, a fifth stator pole 1005e, a sixth stator pole 1005f, a seventh stator pole 1005g, an eighth stator pole 1005h, a ninth stator pole 1005i, a tenth stator pole 1005j, an eleventh stator pole 1005k, a twelfth stator pole 1005l, a thirteenth stator pole 1005m, a fourteenth stator pole 1005n, and a fifteenth stator pole 1005o.

The 15/20 SRM 1000 also includes a first rotor pole 1010a, a second rotor pole 1010b, a third rotor pole 1010c, a fourth rotor pole 1010d, a fifth rotor pole 1010e, a sixth rotor pole 1010f, a seventh rotor pole 1010g, an eighth rotor pole 1010h, a ninth rotor pole 1010i, a tenth rotor pole 1010j, an eleventh rotor pole 1010k, a twelfth rotor pole 1010l, a thirteenth rotor pole 1010m, a fourteenth rotor pole 1010n, a fifteenth rotor pole 1010o, and a sixteenth rotor pole 1010p, a seventeenth rotor pole 1010q, an eighteenth rotor pole 1010r, a nineteenth rotor pole 1010s and a twentieth rotor pole 1010t.

In the illustrated embodiment, the stator pole 1005a has a mechanical angle of 0°, stator pole 1005b has a mechanical angle of 24°, stator pole 1005c has a mechanical angle of 48°, stator pole 1005d has a mechanical angle of 72°, stator pole 1005e has a mechanical angle of 96°, stator pole 1005f has a mechanical angle of 120°, stator pole 1005g has a mechanical angle of 144°, stator pole 1005h has a mechanical angle of 168°, stator pole 1005i has a mechanical angle of 192°, stator pole 1005j has a mechanical angle of 216°, stator pole 1005k has a mechanical angle of 240°, stator pole 1005l has a mechanical angle of 264°, stator pole 1005m has a mechanical angle of 288°, stator pole 1005n has a mechanical angle of 312°, and stator pole 1005o has a mechanical angle of 336°.

Similarly, rotor pole 1010a has a mechanical angle of 0°, rotor pole 1010b has a mechanical angle of 18°, rotor pole 1010c has a mechanical angle of 36°, rotor pole 1010d has a mechanical angle of 54°, rotor pole 1010e has a mechanical angle of 72°, rotor pole 1010f has a mechanical angle of 90°, rotor pole 1010g has a mechanical angle of 108°, rotor pole 1010h has a mechanical angle of 126°, rotor pole 1010i has a mechanical angle of 144°, rotor pole 1010j has a mechanical angle of 162°, rotor pole 1010k has a mechanical angle of 180°, rotor pole 1010l has a mechanical angle of 198°, rotor pole 1010m has a mechanical angle of 216°, rotor pole 1010n has a mechanical angle of 234°, rotor pole 1010o has a mechanical angle of 252°, rotor pole 1010p has a mechanical angle of 270°, rotor pole 1010q has a mechanical angle of 288°, rotor pole 1010r has a mechanical angle of 306°, rotor pole 1010s has a mechanical angle of 324°, and rotor pole 1010t has a mechanical angle of 342°.

In the illustrated embodiment, the stator poles 1005a-1005o have corresponding electrical positions. Stator pole 1005a has an electrical position of 180°, stator pole 1005b has an electrical position of 60°, stator pole 1005c has an electrical position of 300°, stator pole 1005d has an electrical position of 180°, stator pole 1005e has an electrical position of 60°, stator pole 1005f has an electrical position of 300°, stator pole 1005g has an electrical position of 180°, stator pole 1005h has an electrical position of 60°, stator pole 1005i has an electrical position of 300°, stator pole 1005j has an electrical position of 180°, stator pole 1005k has an electrical position of 60°, stator pole 10051 has an electrical position of 300°, stator pole 1005m has an electrical position of 180°, stator pole 1005n has an electrical position of 60°, stator pole 1005o has an electrical position of 300°. In this embodiment, the stator pole groups 1005a, 1005d, 1005g, 1005j and 1005m, stator pole groups 1005b, 1005e, 1005h, 1005k and 1005n, and stator pole group 1005c, 1005f, 1005i, 10051 and 1005o form the three phases of the SRM 1000.

SRM 1000 further comprises coils wound around the stator poles in a mutually coupled configuration. As illustrated, for the phase corresponding to stator poles 1005a, 1005d, 1005g, 1005j and 1005m, the coils 1025a, 1025b, 1025c, 1025d and 1025e are respectively wound around the stator poles in opposite directions. In the illustrated embodiment, when the phase corresponding to stator poles 1005a, 1005d, 1005g, 1005j and 1005m is energized, flux patterns 1015a, 1015b, 1015c, 1015d and 1015e are generated.

As illustrated, flux patterns 1015a, 1015b, 1015c, 1015d and 1015e comprise flux linkages 1015a', 1015a", 1015b', 1015b", 1015c', 1015c", 1015d', 1015d", 1015e' and 1015e" which are generated in the other phases of the SRM when the phase corresponding to stator poles 1005a, 1005d, 1005g, 1005j and 1005m is energized. In the illustrated embodiment, the number of flux patterns, i.e. 5, is equal to the pole-phase index of the SRM 1000, i.e. also 5, which results in a balanced distribution of flux patterns. This may minimize or eliminate any disadvantage arising from imbalanced torque pulsations resulting from an unequal number of flux patterns compared to the pole-phase index of a SRM.

Figure 11:
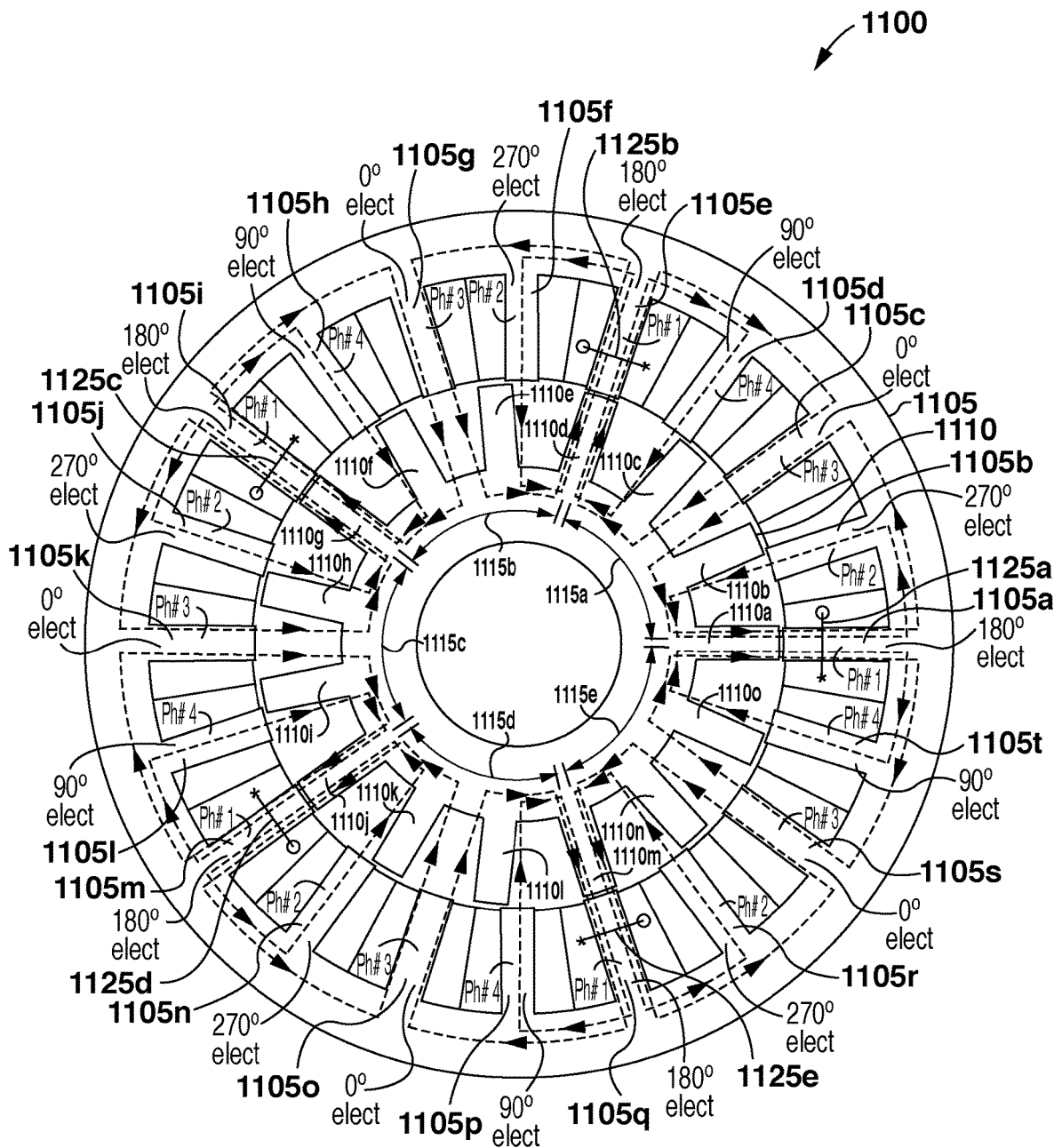
FIG. 11 illustrates a four-phase 20/15 switched reluctance machine according to an example embodiment.

Reference is next made to FIG. 11, which illustrates a cross-sectional view of a four-phase 20/15 SRM 1100 according to an example embodiment. In this embodiment, the pole-phase index is 5 and the configuration index is 3. The SRM 1100 illustrated herein has a stator 1105 and a rotor 1110 located inside the stator 1105. Stator 1105 comprises twenty stator poles and rotor 1010 comprises fifteen rotor poles. Accordingly, the 20/15 SRM 1100 includes a first stator pole 1105a, a second stator pole 1105b, a third stator pole 1105c, a fourth stator pole 1105d, a fifth stator pole 1105e, a sixth stator pole 1105f, a seventh stator pole 1105g, an eighth stator pole 1105h, a ninth stator pole 1105i, a tenth stator pole 1105j, an eleventh stator pole 1105k, a twelfth stator pole 1105l, a thirteenth stator pole 1105m, a fourteenth stator pole 1105n, a fifteenth stator pole 11050, a sixteenth stator pole 1105p, a seventeenth stator pole 1105q, an eighteenth stator pole 1105r, a nineteenth stator pole 1105s and a twentieth stator pole 1105t.

The 20/15 SRM 1100 also includes a first rotor pole 1110a, a second rotor pole 1110b, a third rotor pole 1110c, a fourth rotor pole 1110d, a fifth rotor pole 1110e, a sixth rotor pole 1110f, a seventh rotor pole 1110g, an eighth rotor pole 1110h, a ninth rotor pole 1110i, a tenth rotor pole 1110j, an eleventh rotor pole 1110k, a twelfth rotor pole 11101, a thirteenth rotor pole 1110m, a fourteenth rotor pole 1110n, and a fifteenth rotor pole 11100.

In the illustrated embodiment, the stator pole 1105a has a mechanical angle of 0°, stator pole 1105b has a mechanical angle of 18°, stator pole 1105c has a mechanical angle of 36°, stator pole 1105d has a mechanical angle of 54°, stator pole 1105e has a mechanical angle of 72°, stator pole 1105f has a mechanical angle of 90°, stator pole 1105g has a mechanical angle of 108°, stator pole 1105h has a mechanical angle of 126°, stator pole 1105i has a mechanical angle of 144°, stator pole 1105j has a mechanical angle of 162°, stator pole 1105k has a mechanical angle of 180°, stator pole 1105l has a mechanical angle of 198°, stator pole 1105m has a mechanical angle of 216°, stator pole 1105n has a mechanical angle of 234°, stator pole 1105o has a mechanical angle of 252°, stator pole 1105p has a mechanical angle of 270°, stator pole 1105q has a mechanical angle of 288°, stator pole 1105r has a mechanical angle of 306°, stator pole 1105s has a mechanical angle of 324°, and stator pole 1105t has a mechanical angle of 342°.

Similarly, the rotor pole 1110a has a mechanical angle of 0°, rotor pole 1110b has a mechanical angle of 24°, rotor pole 1110c has a mechanical angle of 48°, rotor pole 1110d has a mechanical angle of 72°, rotor pole 1110e has a mechanical angle of 96°, rotor pole 1110f has a mechanical angle of 120°, rotor pole 1110g has a mechanical angle of 144°, rotor pole 1110h has a mechanical angle of 168°, rotor pole 1110i has a mechanical angle of 192°, rotor pole 1110j has a mechanical angle of 216°, rotor pole 1110k has a mechanical angle of 240°, rotor pole 11101 has a mechanical angle of 264°, rotor pole 1110m has a mechanical angle of 288°, rotor pole 1110n has a mechanical angle of 312°, and rotor pole 1110o has a mechanical angle of 336°.

In the illustrated embodiment, the stator poles 1105a-1105t have corresponding electrical positions. Stator pole 1105a has an electrical position of 180°, stator pole 1105b has an electrical position of 270°, stator pole 1105c has an electrical position of 0°, stator pole 1105d has an electrical position of 90°, stator pole 1105e has an electrical position of 180°, stator pole 1105f has an electrical position of 270°, stator pole 1105g has an electrical position of 0°, stator pole 1105h has an electrical position of 90°, stator pole 1105i has an electrical position of 180°, stator pole 1105j has an electrical position of 270°, stator pole 1105k has an electrical position of 0°, stator pole 1105l has an electrical position of 90°, stator pole 1105m has an electrical position of 180°, stator pole 1105n has an electrical position of 270°, stator pole 1105o has an electrical position of 0°, stator pole 1105p has an electrical angle of 90°, stator pole 1105q has an electrical angle of 180°, stator pole 1105r has an electrical angle of 270°, stator pole 1105s has an electrical angle of 0°, and stator pole 1105t has an electrical angle of 90°.

In this embodiment, the stator pole group 1105a, 1105e, 1105i, 1105m and 1105q, stator pole group 1105b, 1105f, 1105*j*, 1105*n* and 1105*r*, stator pole group 1105*c*, 1105*g*, 1105*k*, 1105*o* and 1105*s*, and stator pole group 1105*d*, 1105*h*, 1105*l*, 1105*p* and 1105*t* form the four phases of the SRM 1100.

SRM 1100 further comprises coils wound around the stator poles in a mutually coupled configuration. As illustrated, for the phase corresponding to stator poles 1105*a*, 1105*e*, 1105*i*, 1105*m* and 1105*q*, the coils 1125*a*, 1125*b*, 1125*c*, 1125*d* and 1125*e* are respectively wound around the stator poles in opposite directions. In the illustrated embodiment, when the phase corresponding to stator poles 1105*a*, 1105*e*, 1105*i*, 1105*m* and 1105*q* is energized, flux patterns 1115*a*, 1115*b*, 1115*c*, 1115*d* and 1115*e* are generated. In addition, when the phase corresponding to stator poles 1105*a*, 1105*e*, 1105*i*, 1105*m* and 1105*q* is energized, flux linkages are generated in the other phases of the SRM. In the illustrated embodiment, the number of flux patterns, i.e. 5, is equal to the pole-phase index of the SRM 1000, i.e. also 5, which results in a balanced distribution of flux patterns around the back material of the stator 1105.

The various embodiments and the teachings disclosed herein can provide SRM manufacturers, users, designers etc. with an additional degree of freedom to realize better efficiency, reduced noise and torque ripple, desirable torque-speed profiles, higher power density and superior torque characteristics. In SRM configurations disclosed herein, the rotor and stator dimensions, coil parameters and other factors can be adjusted for a given pole-phase index and calculated number of rotor poles based on the performance requirements of the SRMs.

The above-described embodiments and applications of the present invention are intended only to be examples. Alterations, modifications and variations may be effected to the particular embodiments by those of ordinary skill in the art, in light of this teaching, without departing from the scope of the claimed invention.

The invention claimed is:

1. A switched reluctance machine comprising:
    a stator including a predetermined number of stator poles, wherein each stator pole is a salient pole;
    a rotor rotatably mounted with respect to the stator, the rotor comprising a plurality of rotor poles, wherein the plurality of rotor poles are salient poles, and
    a single excitation source comprising a plurality of phase windings provided around the predetermined number of stator poles to form at least one phase of the switched reluctance machine, the plurality of phase windings being adapted to carry electric current to generate magnetic flux in the predetermined number of stator poles,
    wherein the plurality of rotor poles and the predetermined number of stator poles are symmetrically disposed, and
    wherein a number of rotor poles is related to the predetermined number of stator poles and a number of phases according to:

$$\left(\frac{N_s}{m}\right) k \operatorname{ceil}\left(\frac{\operatorname{mod}(k, m)}{m}\right),$$

if the number of phases is an odd number, and $$\left(\frac{N_s}{m}\right) k \operatorname{ceil}\left(\frac{\operatorname{mod}\left(k, \frac{m}{2}\right)}{\frac{m}{2}}\right),$$

if the number of phases is an even number,
    wherein $N_s$ is the predetermined number of stator poles, m is the number of phases, and k is a configuration index based on the predetermined number of stator poles and the number of phases, and
    wherein a pole-phase index is an odd number, the pole-phase index being a ratio of the predetermined number of stator poles to the number of phases.

2. The switched reluctance machine of claim 1, wherein the predetermined number of stator poles is an even number if the number of phases is an even number, and wherein the predetermined number of stator poles is an odd number if the number of phases is an odd number.

3. The switched reluctance machine of claim 1, wherein the configuration index is determined according to:

$$k = \left\{\frac{m+2}{2}, \frac{m+2}{2}+1, \frac{m+2}{2}+2, \ldots\right\},$$

if the number of phases is an even number, and $$k = \left\{\frac{m+1}{2}, \frac{m+1}{2}+1, \frac{m+1}{2}+2, \ldots\right\},$$

if the number of phases is an odd number.

4. The switched reluctance machine of claim 1, wherein the plurality of phase windings are provided around the predetermined number of stator poles in a mutually coupled configuration.

5. The switched reluctance machine of claim 1, wherein the predetermined number of stator poles and the plurality of rotor poles are disposed in a configuration selected from a group consisting of an interior rotor configuration, an exterior rotor configuration, an axial flux configuration, a linear configuration, a multiple-rotor configuration and a multiple-stator configuration.

6. The switched reluctance machine of claim 1, wherein the predetermined number of stator poles are equidistant from each other to provide a symmetrical disposition.

7. The switched reluctance motor system of claim 1, wherein the plurality of rotor poles are equidistant from each other to provide a symmetrical disposition.

8. The switched reluctance machine of claim 1, wherein the predetermined number of stator poles and the plurality of rotor poles are manufactured using a soft magnetic material.

9. A switched reluctance machine having salient rotor poles and salient stator poles in a numerical relationship defined by the formula:

$$N_r = \left(\frac{N_s}{m}\right) k \operatorname{ceil}\left(\frac{\operatorname{mod}(k, m)}{m}\right),$$

for an odd number of phases, and $$N_r = \left(\frac{N_s}{m}\right) k \operatorname{ceil}\left(\frac{\operatorname{mod}\left(k, \frac{m}{2}\right)}{\frac{m}{2}}\right),$$

for an even number of phases,
    wherein $N_s$ is a number of salient stator poles, $N_r$ is a number of salient rotor poles, m is a number of phases, and k is a configuration index based on the number of salient stator poles and the number of phases, wherein the salient stator poles and the salient rotor poles are symmetrically disposed, wherein a single excitation source comprising a plurality of phase windings is provided around a predetermined number of stator poles to form at least one phase of the switched reluctance machine, the plurality of phase windings being adapted to carry electric current to generate magnetic flux in the predetermined number of stator poles, and wherein a pole-phase index is an odd number, the pole-phase index being a ratio of the number of salient stator poles to the number of phases.

10. The switched reluctance machine of claim 9, wherein the number of salient stator poles is an even number if the number of phase is an even number, and wherein the number of salient stator poles is an odd number if the number of phases is an odd number.

11. The switched reluctance machine of claim 9, wherein the configuration index is determined according to:

$$k = \left\{ \frac{m+2}{2}, \frac{m+2}{2}+1, \frac{m+2}{2}+2, \ldots \right\},$$

for an even number of phases, and $$k = \left\{ \frac{m+1}{2}, \frac{m+1}{2}+1, \frac{m+1}{2}+2, \ldots \right\},$$

for an odd number of phases.

12. The switched reluctance machine of claim 9, wherein the plurality of phase windings are provided around the salient stator poles in a mutually coupled configuration.

13. The switched reluctance machine of claim 9, wherein the salient stator poles and the salient rotor poles are disposed in a configuration selected from a group consisting of an interior rotor configuration, an exterior rotor configuration, an axial flux configuration, a linear configuration, a multiple-rotor configuration and a multiple-stator configuration.

14. The switched reluctance machine of claim 9, wherein the salient stator poles are equidistant from each other to provide a symmetrical disposition.

15. The switched reluctance machine of claim 9, wherein the salient rotor poles are equidistant from each other to provide a symmetrical disposition.

16. The switched reluctance machine of claim 9, wherein the salient stator poles and the salient rotor poles are manufactured using a soft magnetic material.

17. A method for manufacturing a switched reluctance machine having a plurality of rotor poles and a predetermined number of stator poles comprising:

determining the predetermined number of stator poles;

determining a number of phases;

determining a number of rotor poles based on the predetermined number of stator poles and the number of phases according to $$\left(\frac{N_s}{m}\right)k\text{ceil}\left(\frac{\text{mod}(k,m)}{m}\right),$$

if the number of phases is an odd number, and $$\left(\frac{N_s}{m}\right)k\text{ceil}\left(\frac{\text{mod}\left(k,\frac{m}{2}\right)}{\frac{m}{2}}\right),$$

if the number of phases is an even number, wherein $N_s$ is the predetermined number of stator poles, m is the number of phases, and k is a configuration index based on the predetermined number of stator poles and the number of phases, and wherein a pole-phase index is an odd number, the pole-phase index being a ratio of the predetermined number of stator poles to the number of phases;

providing a stator having the predetermined number of stator poles, wherein each stator pole is a salient pole and the stator poles are symmetrical disposed;

rotatably mounting a rotor with respect to the stator, the rotor having the number of rotor poles, wherein the rotor poles are salient poles at the rotor poles are symmetrically disposed; and winding a plurality of phase windings around the predetermined number of stator poles to form the number of phases of the switched reluctance machine, the plurality of phase windings adapted to carry electric current to generate magnetic flux in the predetermined number of stator poles.

18. The method of claim 17, wherein the predetermined number of stator poles is an even number if the number of phases is an even number, and wherein the predetermined number of stator poles is an odd number if the number of phases is an odd number.

19. The method of claim 17, wherein the configuration index is determined according to:

$$k = \left\{ \frac{m+2}{2}, \frac{m+2}{2}+1, \frac{m+2}{2}+2, \ldots \right\},$$

if the number of phases is an even number, and $$k = \left\{ \frac{m+1}{2}, \frac{m+1}{2}+1, \frac{m+1}{2}+2, \ldots \right\},$$

if the number of phases is an odd number.

20. The method of claim 17, wherein the predetermined number of stator poles and the plurality of rotor poles are disposed in a configuration selected from a group consisting of an interior rotor configuration, an exterior rotor configuration, an axial flux configuration, a linear configuration, a multiple-rotor configuration and a multiple-stator configuration.

* * * * *